United States Patent
Patterson

(10) Patent No.: US 10,192,373 B1
(45) Date of Patent: *Jan. 29, 2019

(54) TAG IDENTIFICATION SYSTEMS AND METHODS

(71) Applicant: SYNAPSE WIRELESS, INC., Huntsville, AL (US)

(72) Inventor: Wade C. Patterson, Huntsville, AL (US)

(73) Assignee: SYNAPSE WIRELESS, INC., Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/835,198

(22) Filed: Dec. 7, 2017

Related U.S. Application Data

(63) Continuation of application No. 14/165,119, filed on Jan. 27, 2014, now Pat. No. 9,870,660.

(51) Int. Cl.
| | | |
|---|---|---|
| *G05B 19/00* | (2006.01) | |
| *G07C 9/00* | (2006.01) | |
| *G06K 7/10* | (2006.01) | |
| *G06K 19/07* | (2006.01) | |
| *G06K 7/00* | (2006.01) | |

(52) U.S. Cl.
CPC ...... *G07C 9/00111* (2013.01); *G06K 7/10009* (2013.01); *G06K 7/0008* (2013.01); *G06K 7/10297* (2013.01); *G06K 19/07* (2013.01); *G06K 19/0701* (2013.01); *G06K 19/0723* (2013.01)

(58) Field of Classification Search
CPC ............... G06K 19/07; G06K 19/0701; G06K 19/0723; G06K 19/07733; G06K 19/07758
See application file for complete search history.

(56) References Cited

U.S. PATENT DOCUMENTS

| | | |
|---|---|---|
| 6,249,212 B1 | 6/2001 | Beigel |
| 7,893,816 B1 | 2/2011 | Kwan |
| 7,893,834 B2 | 2/2011 | Park |
| 8,111,141 B1 | 2/2012 | Brand |
| 8,198,985 B2 | 6/2012 | Tiernay |
| 8,344,853 B1 | 1/2013 | Warner et al. |

(Continued)

OTHER PUBLICATIONS

Wade C. Patterson, U.S. Appl. No. 14/165,119, entitled, "Tag Identification Systems and Methods," filed Jan. 27, 2014.

*Primary Examiner* — Adnan Aziz
(74) *Attorney, Agent, or Firm* — Maynard Cooper & Gale, P.C.; Jon Holland

(57) ABSTRACT

In a tag identification system, active tags are configured to emulate at least one passive tag so that existing passive identifications systems, such as passive radio-frequency (RFID) systems or near field communication (NFC) systems, can be retrofitted to operate with the active tag without having to make expensive hardware updates to the readers within the system. The active tag permits continuous monitoring of its movement or status, as may be desired, regardless of its proximity relative to the readers thereby allowing a system to capture more data regarding the tag's location and use. In addition, the active tag may be compatible with different passive identification systems thereby permitting it to operate with disparate passive identification systems and obviating the need of the user to carry multiple passive tags.

13 Claims, 8 Drawing Sheets

(56) References Cited

U.S. PATENT DOCUMENTS

| | | |
|---|---|---|
| 8,384,523 B1 | 2/2013 | Rodriquez et al. |
| 8,418,064 B2 | 4/2013 | Guagenti et al. |
| 8,446,256 B2 | 5/2013 | Pickham |
| 8,451,098 B2 | 5/2013 | Posamentier |
| 8,947,212 B2 | 2/2015 | Tseng |
| 9,419,687 B1 * | 8/2016 | Buchheit ............... H04B 5/0062 |
| 2001/0050902 A1 | 12/2001 | Tiernay |
| 2003/0001755 A1 | 1/2003 | Tiernay |
| 2003/0067382 A1 | 4/2003 | Spiess |
| 2004/0263319 A1 | 12/2004 | Huomo |
| 2005/0030160 A1 | 2/2005 | Goren |
| 2006/0022800 A1 * | 2/2006 | Krishna ............... G06K 7/0008 |
| | | 340/10.2 |
| 2007/0159338 A1 | 7/2007 | Beber |
| 2008/0130604 A1 | 6/2008 | Boyd |
| 2008/0136635 A1 | 6/2008 | Malik |
| 2008/0146148 A1 * | 6/2008 | Hulvey ................ H04B 5/0062 |
| | | 455/41.1 |
| 2009/0195360 A1 | 8/2009 | Jeon |
| 2009/0231138 A1 * | 9/2009 | Lai ..................... G06K 19/0707 |
| | | 340/572.4 |
| 2010/0123556 A1 | 5/2010 | Rofougaran |
| 2010/0302012 A1 * | 12/2010 | Roesner ............... G06K 7/0008 |
| | | 340/10.5 |
| 2011/0148602 A1 | 6/2011 | Goh |
| 2014/0077933 A1 | 3/2014 | Yang |
| 2014/0124493 A1 | 5/2014 | Enyedy |

\* cited by examiner

TAG IDENTIFICATION SYSTEMS AND METHODS

CROSS REFERENCE TO RELATED APPLICATION

This application is a continuation of and claims priority to U.S. patent application Ser. No. 14/165,119, entitled "Tag Identification Systems and Methods" and filed on Jan. 27, 2014, which is incorporated herein by reference.

RELATED ART

Access to restricted areas is often controlled through the use of passive radio-frequency identification ("passive RFID"). In this regard, a passive RFID system generally comprises at least one active RFID reader and at least one passive RFID tag. The active RFID reader periodically transmits an interrogation signal for interrogating any RFID tags that are within a short distance of the reader, such as a few inches or, in some cases, in direct contact with the reader. If an RFID tag is close enough to the reader, the interrogation signal energizes an electrical circuit within the tag, which stores a tag identifier in non-volatile memory. When energized by the interrogation signal, the electrical circuit modulates a signal with data defining the tag identifier and possibly other information and wirelessly transmits the signal to the reader. Based on the tag identifier, a controller in communication with the reader determines whether to permit access to the restricted area. As an example, the controller may control the locking state of a door to the restricted area based on the identifier returned by the tag. If the controller determines that the returned tag identifier is valid, the controller automatically unlocks the door to permit entry to the restricted area. If not, the controller refrains from unlocking the door thereby preventing unauthorized access to the restricted area.

While an RFID system can employ active tags, passive tags can be particularly beneficial in many applications due to various factors. In this regard, passive tags do not generally require batteries, which have a finite life expectancy, and passive tags are typically less costly than active tags. In addition, passive tags generally operate within a short range, such as a few inches, of the reader that provides the interrogation signal. Thus, when a tag is worn by a user, identification of the tag generally confirms that the user is within a close proximity of the reader, which may be beneficial for various applications, such as when the system is used to control access to restricted areas. For example, when a tag is used to unlock a door so that a user may pass through the door a restricted area, identification of the tag at the reader confirms that the user is physically at the door and ready to pass through it, assuming that the reader is situated in a close proximity to the door.

Once an RFID system is installed, updating the system can be problematic. For example, the system may have expensive hardware (e.g., readers) installed throughout a facility and replacing this hardware can be burdensome and costly. In addition, a large organization may have multiple RFID systems at one or more facilities where at least one of the RFID systems is incompatible with at least one of the other RFID systems. In such situation, employees or other personnel associated with the organization may have multiple tags for the different RFID systems, and keeping track of multiple tags per user can be burdensome. In some cases, it may desirable to upgrade the disparate RFID systems to a single system, but the costs of performing the upgrade can be significant.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to tag identification systems and methods. In one exemplary embodiment, an active tag is configured to emulate at least one passive tag so that existing passive identifications systems, such as passive radio-frequency (RFID) systems or near field communication (NFC) systems, can be retrofitted to operate with the active tag without having to make expensive hardware updates to the readers within the system. The active tag permits continuous monitoring of its movement or status, as may be desired, regardless of its proximity relative to the readers thereby allowing the system to capture more data regarding the tag's location and use. In addition, the active tag may be compatible with different passive identification systems thereby obviating the need of the user to carry multiple passive tags.

Figure 1:
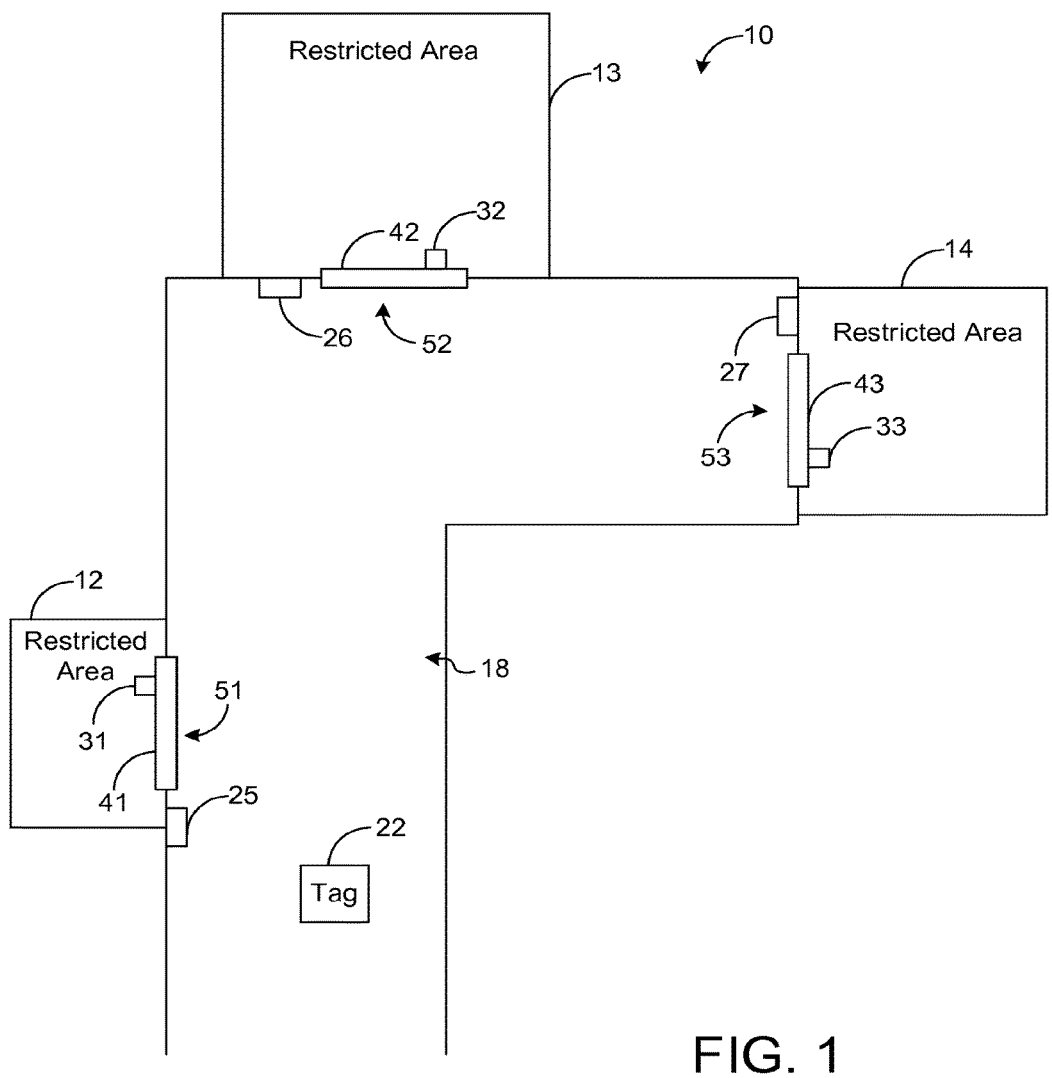
FIG. 1 is a block diagram illustrating a conventional passive tag identification system.
Figure 2:
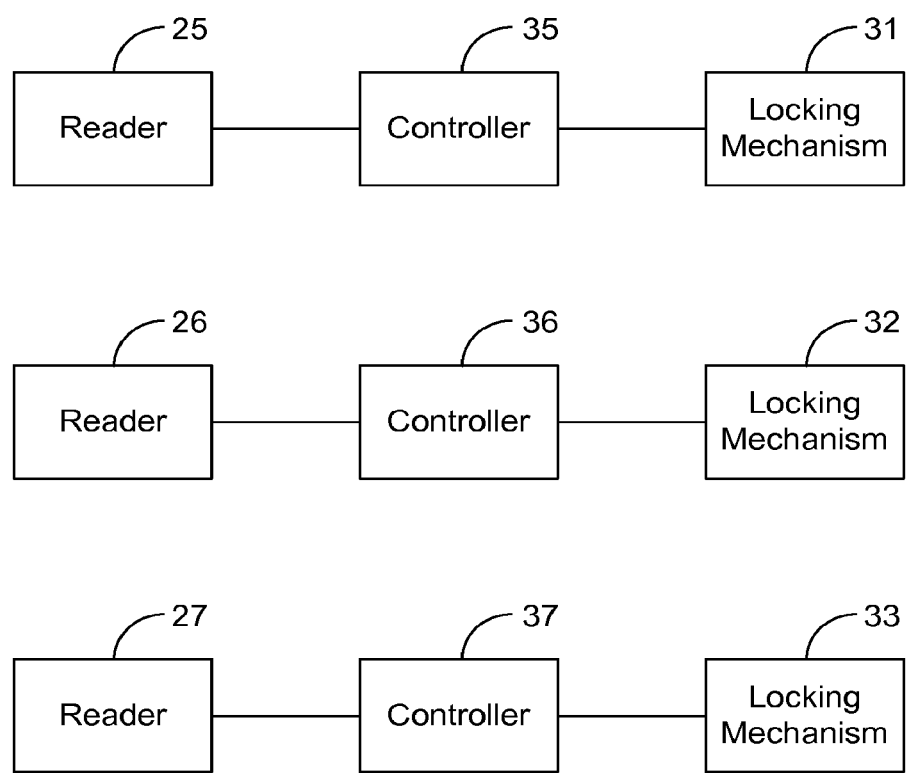
FIG. 2 is a block diagram illustrating exemplary controllers for controlling access to restricted areas depicted in FIG. 1.

FIG. 1 depicts a conventional passive RFID system 10 for controlling access to a plurality of restricted areas 12-14. In FIG. 1, the restricted areas 12-14 are rooms within a building, and the rooms can be accessed from a hallway 18, as will be described in more detail below. The system 10 comprises a passive RFID tag 22 and a plurality of RFID readers 25-27 that are in communication with controllers 35-37, respectively, and each of the controllers 35-37 controls access to a respective restricted area. For example, as shown by FIGS. 1 and 2, the controller 35 is coupled to and controls a locking mechanism 31 of a door 41 based on the reader 25, and the controller 35 normally keeps the locking mechanism 31 in a locked state thereby preventing the door 41 from opening. When the door 41 is closed and locked, users in the hallway 18 are prevented from passing through the doorway 51 to enter the restricted area 12. When the controller 35 determines that access to the restricted area 12 is permissible based on reader 25 or otherwise, the controller 35 transmits a control signal to the locking mechanism 31 causing such mechanism 31 to transition to an unlocked state. When the locking mechanism 31 is in an unlocked state, a user in the hallway 18 may open the door 41 and enter into the restricted area 12 through the doorway 51.

Referring to FIGS. 1 and 2, the controller 36 is coupled to and controls a locking mechanism 32 of a door 42 based on reader 26, and the controller 37 is coupled to and controls a locking mechanism 42 of a door 43 based on reader 27. Through techniques similar to those described above for the controller 35, the controller 36 controls the locking mechanism 42 based on the reader 26 in order to control access to the restricted area 13 through a doorway 52, and the controller 37 controls the locking mechanism 43 based on the reader 27 in order to control access to the restricted area 14 through a doorway 53. For simplicity of illustration, it will be assumed hereafter that the controllers 36 and 37, the readers 26 and 27, and the locking mechanisms 42 and 43 are generally configured the same and operate the same as controller 35, the reader 25, and the locking mechanism 41, respectively, except as is otherwise described herein.

Note that the controllers 35-37 may be implemented in hardware, software, firmware, or any combination thereof. As an example, the controllers 35-37 may comprise analog circuitry and/or digital logic for performing various functions, as will be described in more detail hereafter. If any controller includes software or firmware for performing such functions, the controller may comprise memory for storing the software or firmware, and the controller may also comprise an instruction execution apparatus, such as a digital signal processor (DSP) or central processing unit (CPU) for executing such software.

During operation, access to the restricted areas 12-14 is controlled via interaction between the passive tag 22 and the readers 25-27. In this regard, the tag 22 has an embedded passive electrical circuit (not shown) in which an identifier, referred to hereafter as "tag identifier," and possibly other information is stored in non-volatile memory. The tag 22 is not equipped with a power supply and generally performs no operations until it is interrogated by a signal from a reader 25-27, as will be described in more detail hereafter.

Each reader 25-27 periodically transmits a wireless interrogation signal for interrogating the tag 22 when it comes close, such as within a few inches, of the respective reader 25-27. As an example, assume that a user desires to enter the restricted area 13 and begins walking toward the door 42. The user typically carries the tag 22 as he or she walks. For example, the tag 22 may be attached to the clothing of the user or inserted into a pocket of the user's clothes. As the user begins approaching the door 42 and, therefore, the reader 26 (which is positioned close to the door 42), the user may position the tag 22 such that it begins to receive the interrogation signals that are periodically transmitted by the reader 26. Once the user positions the tag 22 close enough to the reader 26 such that the strength of an interrogation signal received from the reader 26 exceeds a threshold, the passive electrical circuit in the tag 22 is energized by the interrogation signal through inductive coupling such that the tag's electrical circuit responds to the interrogation signal. Using the electrical energy from the interrogation signal, the electrical circuit wirelessly transmits the tag identifier that is stored in the tag 22. If desired, the electrical circuit may also transmit other information stored in the tag 22.

The controller 26 typically stores or otherwise accesses a list of tag identifiers that are valid for authorizing access to the restricted area 13 corresponding to the reader 26. As an example, the controller 26 may be in communication with a remote storage device (not shown), such as a database, for storing the list of valid tag identifiers and from time-to-time receive such list from the remote storage device. Thus, the list can be updated remotely by a user without having to travel to the location of the reader 26 or controller 36. Also, note that it is unnecessary for the controller 26 to be located close to the reader 26. As an example, the controller 36 may be located remotely from the reader 26 and the door 52 and communicate with the reader 26 and the locking mechanism 32 through a network (not shown), such as a local area network (LAN) or wide area network (WAN).

When the reader 26 receives the tag identifier transmitted by the tag 22, the reader 26 transmits such tag identifier to the controller 36, which compares the received tag identifier to the list of valid tag identifiers stored for the reader 26. If the received tag identifier does not match any of the stored tag identifiers, the controller 36 discards the received tag identifier without changing the state of the locking mechanism 32, which as described above is normally in a locked state. However, if the received tag identifier matches one of the stored tag identifiers, the reader 26 transitions the locking mechanism 32 to an unlocked state thereby permitting the user of the tag 22 to open the door 42 or automatically opening the door 42 for the user. Thus, the user is permitted to enter the restricted area 13 through the doorway 52.

Note that the reader 26 may be configured such that several events must occur before it will provide the tag identifier to the controller 36 for analysis in determining whether to transition the locking mechanism 32 to an unlocked state. In this regard, when the reader 26 transmits an interrogation signal, the reader 26 looks for a return signal that is within a specific frequency range (e.g., the frequency range of the interrogation signal) and within a certain time window from transmission of the interrogation signal. This time window corresponds to an amount of time that is expected for the interrogation signal to energize the tag 22 causing it to send a response signal back to the reader 26. Specifically, the time window is defined such that, if the tag 22 is close to the reader 26, the response signal transmitted from the tag 22 will be received in the window.

The received signal strength of the response signal should be within a certain range, referred to herein as "strength window," in order to be successfully received by the reader 26. This strength window corresponds to the expected strength of the return signal when it is transmitted by the tag 22 within a certain distance of the reader 26. In this regard, it is expected that the tag 22 will only transmit a return signal when it is within a close proximity of the reader 26. If the tag 22 is too far away, then the strength of the interrogation signal may be too low to energize the tag 22. Thus, the circuitry of the reader 26 is designed to read a return signal having a received signal strength within the strength window. If the received signal strength is above or below this window, then the reader 26 may be unable to successfully detect such signal.

Thus, for a successful unlock event to occur, the reader 26 should receive a signal that (1) is within a certain time window after the reader transmits an interrogation signal, (2) is within a certain frequency range, referred to herein as "frequency window," (3) has a received signal strength within a certain strength window, and (4) defines a tag identifier that is included in the associated list of valid tag identifiers.

Note that the tag 22 may be similarly used to gain access to the restricted areas 12 and 14, assuming that its tag identifier is included in the list of valid tag identifiers for the readers 25 and 27. However, the user may be selectively prevented from gaining access to any of the restricted areas 12-14 by defining the lists of valid tag identifiers such that the identifier of the tag 22 is not in the list of valid tag identifiers for the corresponding reader 25-27. For example, the user may be prevented from accessing the restricted area 12 if the list of valid tag identifiers for the reader 25 does not include the identifier of the tag 22.

The system 10 has been described above in the context of a passive RFID system that uses active readers 25-27 and passive tags 22 that communicate within a short distance, such as a few inches. It is possible to implement similar systems using other types of technologies. As an example, the readers 25-27 may be NFC devices.

Figure 3:
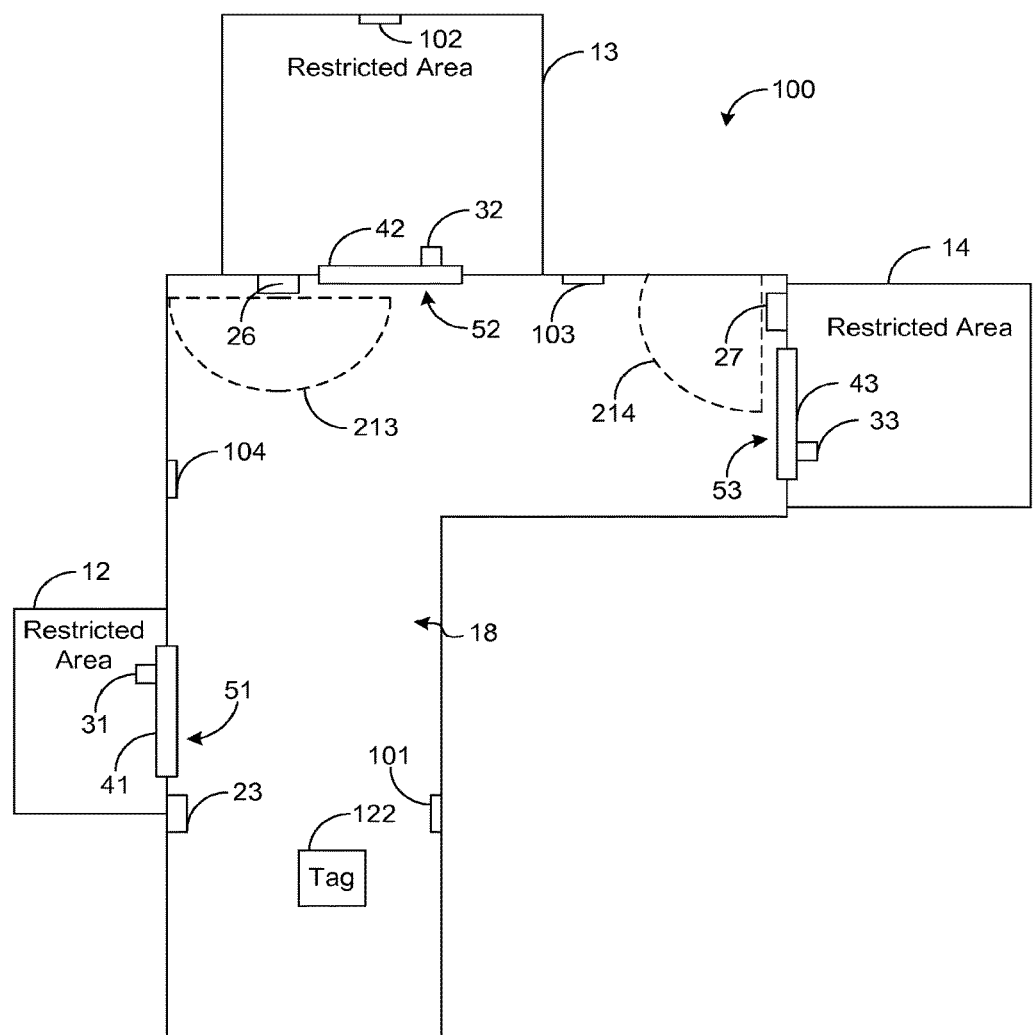
FIG. 3 is a block diagram illustrating an exemplary embodiment of an active tag identification system.
Figure 4:
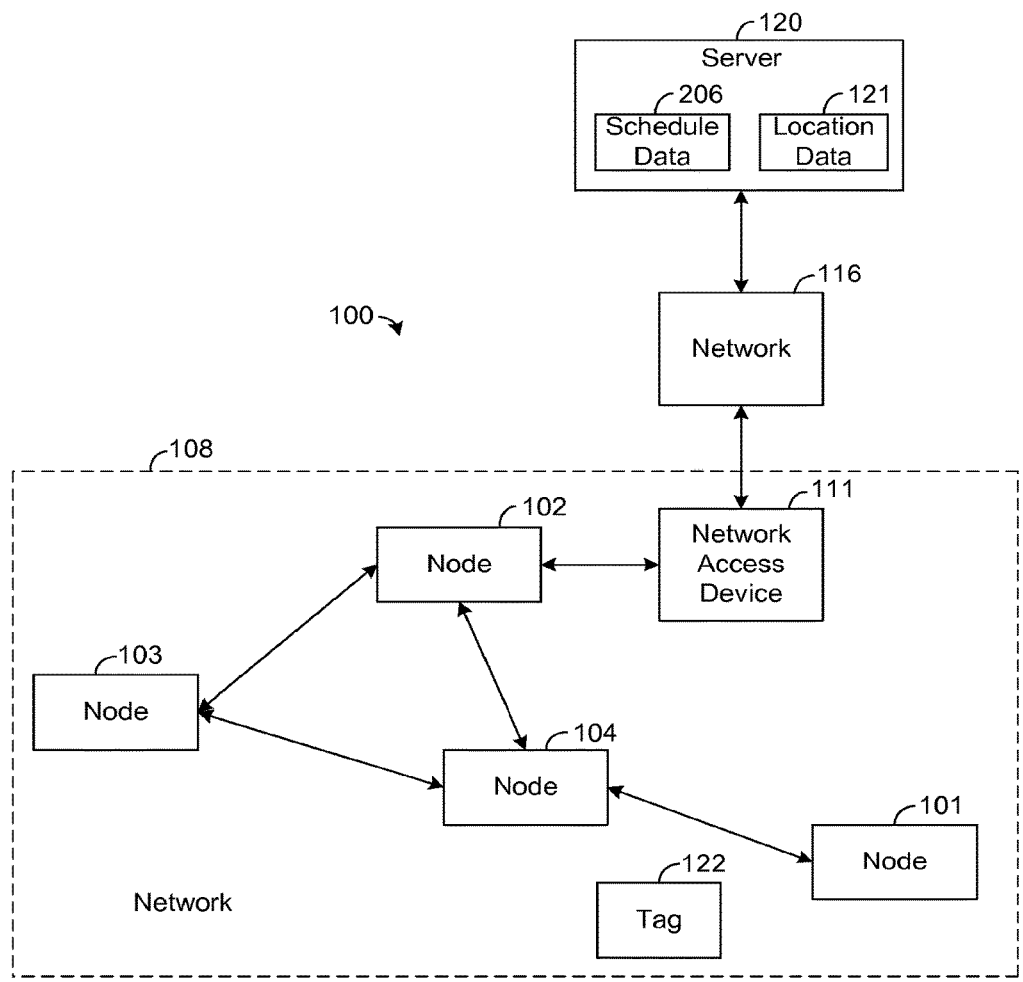
FIG. 4 is a block diagram illustrating an exemplary embodiment of a wireless tracking system.

FIG. 3 shows the identification system 10 after a wireless tracking system 100 is installed for tracking tags as they move. As shown by FIGS. 3 and 4, the system 100 comprises a plurality of nodes 101-104. FIG. 3 depicts four nodes 101-104 for simplicity, but the system 100 may have any number of nodes 101-104 in other embodiments. In one exemplary embodiment, the system 100 and, in particular, the nodes 101-104 implement a wireless mesh network 108, but other types of networks may be implemented in other embodiments. Exemplary mesh networks are described in commonly-assigned U.S. patent application Ser. No. 12/114,566, entitled "Systems and Methods for Dynamically Configuring Node Behavior in a Sensor Network," and filed on May 2, 2008, which is incorporated herein by reference, and commonly-assigned U.S. Pat. No. 8,204,971, entitled "Systems and Methods for Dynamically Configuring Node Behavior in a Sensor Network" and filed on May 24, 2011, which is incorporated herein by reference.

Each node 101-104 is able to communicate with any of the other nodes 101-104. In one exemplary embodiment, the nodes 101-104 communicate among one another wirelessly, but it is possible for any of the nodes 101-104 to communicate with any of the other nodes 101-104 over a conductive medium or otherwise. Messages may hop from node-to-node in order to reach a destination. For example, in the exemplary embodiment shown by FIG. 4, the nodes 102-104 are within range of each other such that any of the nodes 102-104 can communicate directly with any of the other nodes 102-104. However, the node 101 is only within range of node 104. The other nodes 102 and 103 can use the node 104 to communicate with the node 101. Indeed, a message may hop through any number of nodes to reach its intended destination.

Referring to FIG. 4, at least one node 102 is coupled to a network access device 111, which may have a network address and be a member of the network 108 formed by the nodes 101-104. The network access device 111 is communicatively coupled to a network 116, such as a LAN or WAN, and interfaces messages between a protocol of the network 108 and a protocol of network 116. As an example, in one embodiment, the network 116 comprises the Internet, and messages compatible with the network 108 are encapsulated in accordance with Transmission Control Protocol/Internet Protocol for transmission across the network 116. In another embodiment, the network 116 comprises a LAN employing Ethernet protocols, and messages compatible with the network 108 are encapsulated in accordance with Ethernet protocol for transmission across the network 116. In another exemplary embodiment, the network 116 may comprise a power-line network that communicates data messages across power lines, which simultaneously carry power signals (e.g., high-voltage transmission signals).

As shown by FIG. 4, the network 116 is communicatively coupled to a server 120, which will be described in more detail below. In one exemplary embodiment, the server 120 has a network address and is a member of the network 108 formed by the nodes 101-104. Messages compatible with network 108 are communicated between the server 120 and the nodes 101-104 via the network 116 and network access device 111, as will be described in more detail below. Note that server 120 may reside at a location close to at least one node 101-104 such that use of the network 116 and network access device 111 to communicate between the server 120 and the nodes 101-104 is unnecessary.

As shown by FIG. 3, the system 100 comprises at least one tag 122 that is configured to wirelessly communicate with the nodes 101-104. The tag 122 is a mobile device that may be attached or otherwise positioned on a mobile asset (e.g., a person or object) in order to track movements of the asset, as will be described in more detail hereafter. In one exemplary embodiment, the tag 122 is an active device having at least one battery for powering electrical components of the tag 122, which will be described in more detail below. In addition, the tag 122 has a network address and is a member of the network 108, but it is preferably not configured to route messages through the network 108. In this regard, the tag 52 may transmit a network message to another node 101-104 for communication of the message through the network 108, and messages to be received and processed by the tag 122 may be communicated to the tag 122 through the network 108. However, the tag 122 does not serve as a hop for messages and, thus, does not attempt to re-transmit messages received by it. Preventing the tag 122 from performing routing functions helps to conserve the tag's power. In this regard, not only are the tag's functions reduced, but the tag may sleep from time-to-time while the nodes 101-104 remain operational for routing functions. However, if desired, the tag 122 may be configured to route messages in other embodiments.

Figure 5:
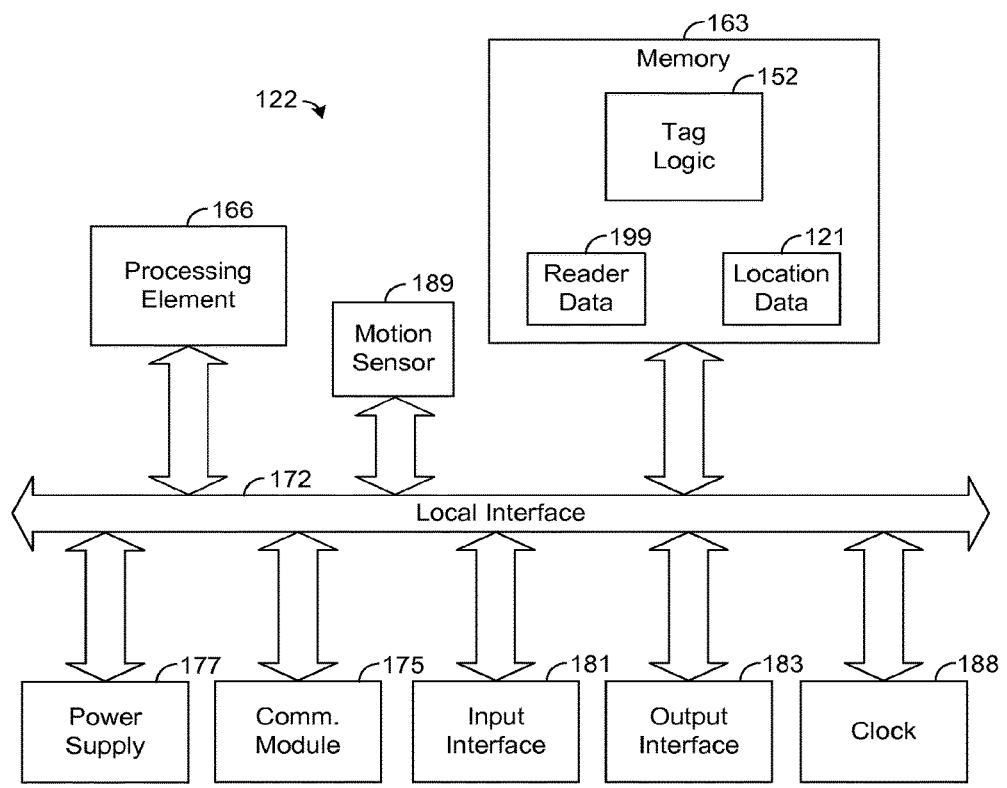
FIG. 5 is a block diagram illustrating an exemplary embodiment of an active tag, such as is depicted by FIG. 3.

FIG. 5 depicts an exemplary embodiment of the tag 122. As shown by FIG. 5, the tag 122 comprises tag logic 152 for generally controlling the operation of the tag 122, as will be described in more detail hereafter. The tag logic 152 can be implemented in software, hardware, firmware or any combination thereof. In the exemplary tag 122 illustrated by FIG. 5, the tag logic 152 is implemented in software and stored in memory 163 of the tag 122.

Note that the tag logic 152, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary tag 122 depicted by FIG. 4 comprises at least one conventional processing element 166, such as a digital signal processor (DSP) or a central processing unit (CPU), for executing instructions stored in memory 163. The processing element 166 communicates to and drives the other elements within the tag 122 via a local interface 172, which can include at least one bus. In addition, the tag 122 has a communication module 175, which comprises an RF radio or other wireless communication device for communicating wirelessly. The tag 122 also has a power supply 177, such as one or more batteries, which provide electrical power to the components of the tag 122. In addition, the tag 122 has an input interface 181, such as a keypad, touchscreen, or data port (e.g., a universal serial bus (USB) port) for receiving data, and an output interface 183, such as a display screen, speaker, vibrator, light source (e.g., a light emitting diode), or data port for providing output. The tag 122 also has a clock 188 for tracking time.

In one exemplary embodiment, the tag 122 is configured to communicate with the nodes 101-104 so that the location of the tag 122 can be tracked. In this regard, each node 101-104 transmits a wireless signal, referred to hereafter as "beacon," that can be received by the tag's communication module 175. For illustrative purposes, assume that the tag 122 receives the beacon transmitted by the node 101. The communication module 175 is configured to measure a received signal strength of the beacon, and the tag logic 152 is configured to transmit a message having a value, referred to as a "received signal strength indicator" (RSSI), indicative of the received signal strength of the beacon. Such message is communicated to the server 120 via the nodes 101-104, network access device 111, and network 116. Based on the RSSI in the message, the server 120 is configured to determine the location of the tag 122. In this regard, the RSSI is indicative of the distance of the tag 122 from the node 101, and the server 120 is configured to estimate the tag's distance from the node 101 based on the RSSI reported by the tag 122.

In some cases, the tag 122 may receive beacons from multiple nodes 101-104 and report the RSSI to the server 120 for each beacon. In such case, the server 120 is configured to estimate the tag's distance from multiple nodes 101-104 and use triangulation, trilateration, or some other location-determining algorithm to determine the tag's precise location. In other embodiments, other techniques may be used to determine the tag's location.

Note that the location-determining algorithm may utilize information indicative of various points of references in order to calculate the location of the tag 122. As shown by FIG. 4, the server 120 may store location data 121 indicative of the locations of such points of reference. As an example, the location data 121 may include the location coordinates of each of the nodes 101-104. Knowing the locations of the nodes 101-104 and the estimated distances of the tag 122 from multiple nodes 101-104, it is possible to calculate the location coordinates of the tag 122. The location data 121 may indicate the locations of other points, such as the locations of the readers 25-27 and restricted areas 12-14, for example.

The server 120 is configured to store the tag's locations over time to define a history of the tag's movement. Such history can be later analyzed to determine the tag's location at any given time during tracking. In one exemplary embodiment, the server 120 is configured to enforce various rules and take certain actions based on the tag's location. As an example, the server 120 may store data indicating which areas of a facility or other location the tag 122 is authorized to access. If the server 120 determines that the tag 122 is currently in an unauthorized area, the server 120 may generate an alarm. The server 120 may also transmit a message to the tag 122 for causing the tag to provide an output for warning the user of the tag 122. Various other types of actions may be taken in other embodiments based on the tag's location.

If desired, functions described herein as being performed by the server 120 may be performed by the tag 122. As an example, the tag logic 152 may be configured to estimate its distances from the nodes 101-104 based on the received signal strengths of beacons or otherwise and to then determine the tag's location based on such distances. In such embodiment, the location data 121 described above may be stored at the tag 122, as shown by FIG. 5.

In one exemplary embodiment, the tag 122 is configured to communicate with the readers 25-27 in order to provide the user of the tag 122 access to restricted areas 12-14 for which he or she is authorized to access. Thus, the active tag 122 may be used as a replacement for the passive tag 22 described above with reference to FIG. 1. Further, in one exemplary embodiment, the use of the active tag 122 in lieu of the conventional passive tag 22 is transparent to the readers 25-27 and controllers 35-37. That is, the tag 122 is configured to communicate with the readers 25-27 such that they are unaware that they are not communicating with a conventional passive tag 22. Thus, there is no need to reconfigure or update the readers 25-27 or controllers 35-37 in order to enable communication with the tag 122, and the readers 25-27 may operate in conjunction with the tag 122, as will be described in more detail hereafter.

For example, as described above, the readers 25-27 may be configured such that a successful read occurs when a reader 25-27 receives a signal that is within a certain frequency window, a certain signal strength window, and a certain time window relative to a transmission of an interrogation signal by the reader. Such windows are illustrated in FIGS. 6 and 7.

Figure 6:
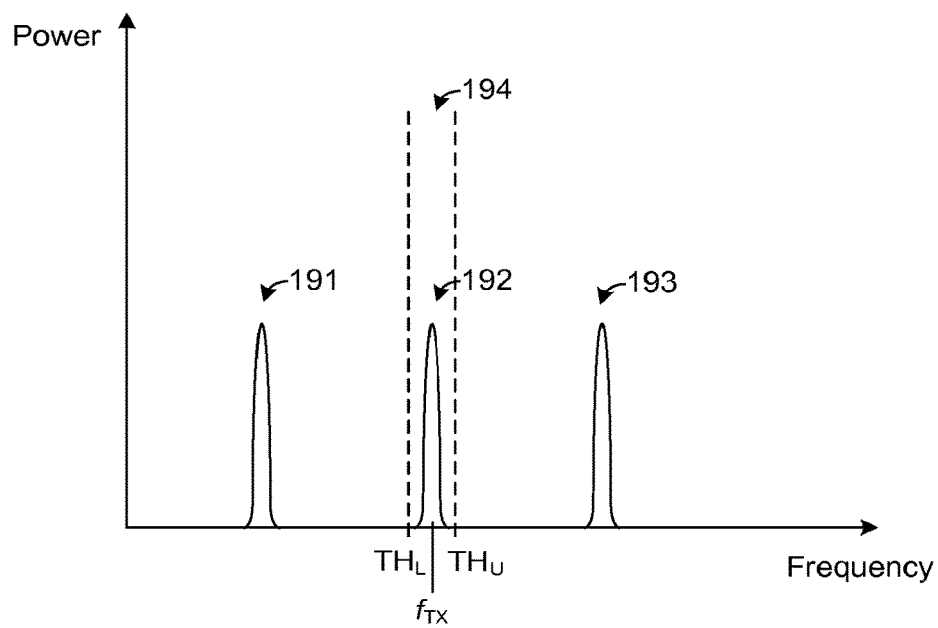
FIG. 6 is a graph illustrating power versus frequency for exemplary signals received by a reader, such as is depicted by FIG. 3.

In this regard, FIG. 6 shows an exemplary graph of power versus frequency when the reader 26 is receiving three narrowband signals, represented by curves 191-193, respectively. Referring to FIG. 6, the reader 26 may be configured to filter energy outside of the frequency window 194, which corresponds to a passband centered around the frequency ($f_{TX}$) of the interrogation signal transmitted by the reader 26. Thus, the reader 26 suppresses the signals represented by curves 191 and 193 and only processes the signal represented by curve 192 within the reader's passband. Accordingly, if the tag 122 transmits a signal having a frequency outside of the frequency window 194 (i.e., less than a lower frequency threshold ($TH_L$) or greater than an upper frequency threshold ($TH_U$)), then the signal will not be successfully received by the reader 26.

Figure 7:
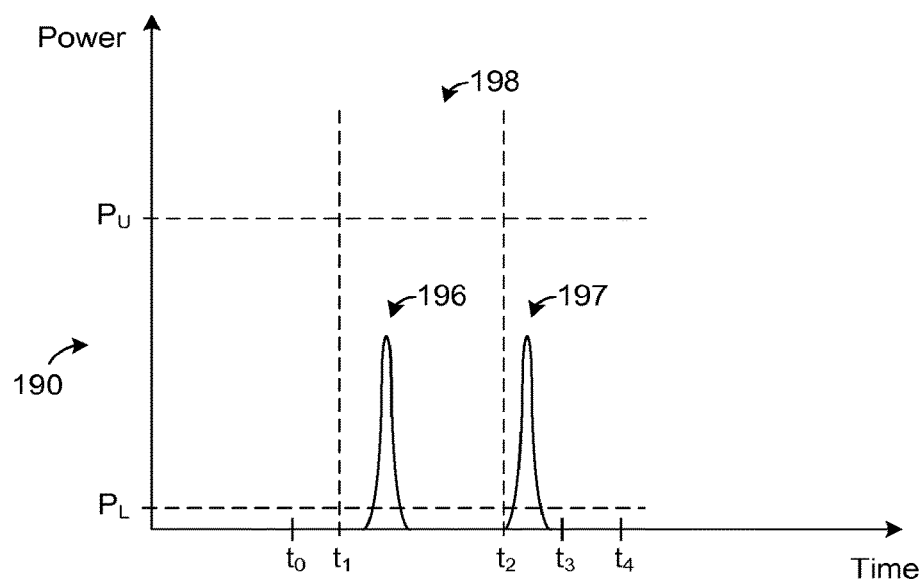
FIG. 7 is a graph illustrating power versus time for exemplary signals received by a reader, such as is depicted by FIG. 3.

FIG. 7 shows an exemplary graph of power versus time when the reader is receiving two signals, represented by curves 196 and 197, respectively. Referring to FIG. 7, the reader 26 is configured to transmit two successive interrogation signals at times to and $t_3$, respectively. Further, the reader 26 may be configured to begin looking for a response signal for the first interrogation signal at some time $t_1$ after transmission of this interrogation signal and stop looking for such response signal after some time $t_2$ after transmission of the first interrogation signal, thereby defining a time window 198 between $t_1$ and $t_2$. Thus, since the signal represented by curve 196 is within this time window 198, such signal should be successfully received by the reader 26, assuming that its signal strength and frequency are within the appropriate signal strength window and frequency window, respectively. However, the signal represented by the curve 197 is received after the reader 26 stops looking for a response to the first interrogation signal (i.e., after $t_2$) and before the reader begins looking for a response to the second interrogation signal (i.e., before $t_3$). Thus, this signal is not successfully received by the reader 26.

FIG. 7 also shows a signal strength window 190 having an upper power threshold $P_U$ and a lower power threshold $P_L$.

The lower threshold $P_L$ may be set just above the expected noise floor in an effort to mitigate the effects of noise. If received energy is below $P_L$, the reader 26 refrains from processing the energy. If the power of a received signal exceeds $P_U$, then components of the reader 26 may saturate such that the reader 26 is unable to detect modulation of the received signal. In FIG. 7, the signal represented by the curve 196 should be successfully received by the reader 26 since it is within an expected time window between $t_1$ and $t_2$ and since its signal strength is within the signal strength window 190 between $P_L$ and $P_U$.

In one exemplary embodiment, the tag 122 is configured to transmit a signal that is within the frequency window, signal strength window, and time window expected by a reader 25-27 for a response to its interrogation signal. As an example, assume that, as the tag 122 is approaching the reader 26, the communication module 175 of the tag 122 receives an interrogation signal from the reader 26. In response to the interrogation signal, the tag logic 152 is configured to transmit to the reader 26 a signal, referred to hereafter as "tag signal." The timing and frequency of the tag signal are controlled based on the interrogation signal such that they are respectively within the time window and the frequency window expected by the reader 26 for a response.

In particular, with respect to the timing window, the tag logic 152 is configured to track time based on the clock 188 after receiving an interrogation signal. Once the elapsed time from reception of the interrogation signal exceeds a predefined threshold, the tag logic 152 is configured to wirelessly transmit the tag signal via the communication module 175. The threshold is preferably set such that the reader 26 receives the tag signal within the expected time window that is associated with the interrogation signal. As an example, when the conventional passive tag 22 receives an interrogation signal from the reader 26, there is a finite delay that occurs before the passive tag 22 transmits a response signal. In particular, there is a delay as the electrical circuit within the passive tag 22 energizes and then performs processing in order to transmit the response signal. In FIG. 7, such delay may correspond approximately to the difference between $t_1$ and $t_0$. For the active tag 122 illustrated by FIG. 5, the tag logic 152 may account for such delay by transmitting the tag signal at a similar delay from the time of reception of the interrogation signal. Thus, in FIG. 7, the tag logic 152 may transmit the tag signal at about or shortly after time $t_1$.

In addition, the tag logic 152 may also account for the location of the tag 122 in determining when to transmit the tag signal. In this regard, as described above, it is generally expected for the passive tag 22 to be close to the reader 26 (e.g., a few inches depending on the application or identification technology employed) when responding to an interrogation signal from the reader 26. However, the active tag 122 may not rely on the energy from the interrogation signal in order to transmit the tag signal and, thus, may be located a greater distance away when responding to the interrogation signal. Generally when the tag 122 is located a greater distance away from the reader 26, it takes longer for the tag signal to reach the reader 26. Based on the tag's distance from the reader 26 and the expected delay associated with the passive tag 22, the tag logic 152 may be configured to adjust the timing of the tag signal's transmission such that it arrives at the reader 26 at approximately the same time that a response signal from the passive tag 22 would have arrived at the reader 26 if the passive tag 22 would have been close enough to the reader 26 in order to respond to the interrogation signal.

Note that there are various methodologies that may be used to ensure that the tag signal arrives at the reader 26 within the expected timing window (e.g., within a certain time period after transmission of an interrogation signal). In one exemplary embodiment, the expected delay for the conventional passive tag 22 is known such that the appropriate amount of delay to be used by the active tag 122 can be calculated. In such embodiment, information indicative of the desired delay for the reader 26 is downloaded to the tag 122 and stored in memory 163 as data 199, referred to herein as "reader data." As an example, the reader data 199 may include a time threshold corresponding to a delay that is to be used by the tag logic 152 for the reader 26. As described above, when an interrogation signal from the reader 26 is received, the tag logic 152 begins to track time and transmits the tag signal after the foregoing time threshold is exceeded.

In another example, the reader data 199 may define a table of time thresholds respectively correlated with distance values. In such an embodiment, based on the tag's current distance from the reader, the tag logic 152 looks up the time threshold that is correlated with the tag's approximate distance from the reader 26. Thus, the time threshold selected is based on the tag's distance from the reader 26. The tag logic 152 may also calculate the time threshold or desired delay on the fly.

In other embodiments, the expected delay of the conventional passive tag 22 may be unknown or the reader data 199 described above may be unavailable. In such case, the tag logic 152 may be unaware of the precise delay to use in order to ensure that the tag signal is transmitted at the appropriate time to arrive at the reader 26 during the expected time window. In such an embodiment, the tag logic 152 may be configured to repetitively transmit the tag signal after receiving the interrogation signal such that at least one of the tag signals is likely to be received by the reader 26 during the expected time window.

For example, after receiving an interrogation signal from the reader 26, the tag logic 152 may be configured to periodically transmit the tag signal for a duration, referred to herein as "response period," that is sufficiently long so that it is likely that the periodic transmissions continue for a time beyond the expected time window within a desired margin of error. Further, the transmission rate of the tag signals is sufficiently fast (or, in other words, the time between successive tag signals is sufficiently short) so that it is likely that at least one of the tag signals is received during the expected time window. In one exemplary embodiment, the tag logic 152 is configured to transmit the tag signal every few milliseconds during the response period after detection of an interrogation signal.

Figure 8:
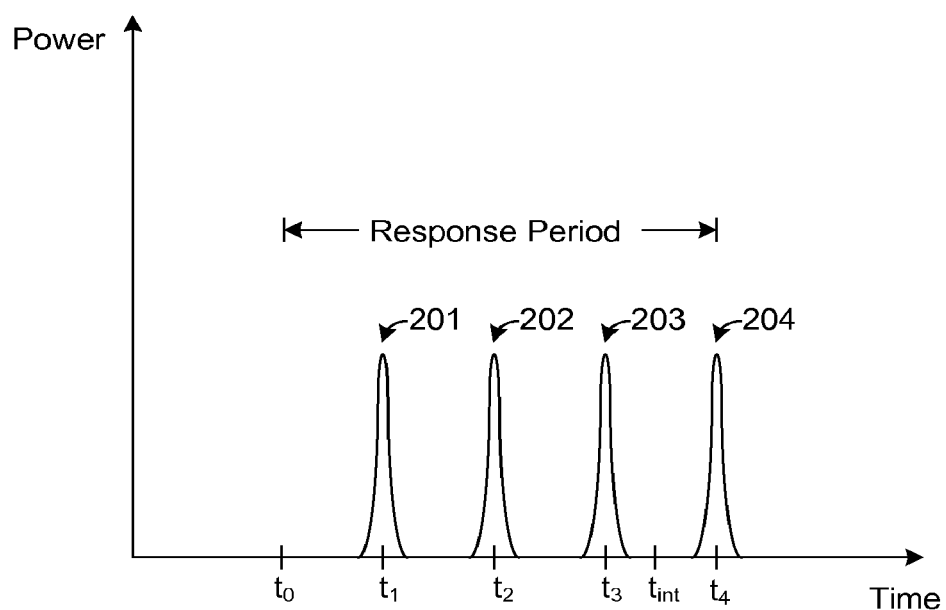
FIG. 8 is a graph illustrating power versus time for exemplary tag signals transmitted by an active tag, such as is depicted by FIG. 5, in response to an interrogation signal from a reader, such as is depicted by FIG. 3.

As an example, referring to FIG. 8, assume that the tag logic 152 detects an interrogation signal at time $t_0$. In response, for a duration of a response period extending from $t_0$ to $t_4$, the tag logic 152 periodically transmits four tag signals, represented as curves 202-204, respectively. Shortening the time between successive tag signals during the response period may increase the likelihood that at least one of the tag signals will be within the expected time window for the reader 26. However, shortening the time between successive tag signals also may increase the number of tag signals that will fit within the response period, thereby requiring more power to transmit the additional tag signals. Accordingly, the duration of the response period and the rate of the tag signal transmissions within the response period may be optimized based on desired performance considerations.

Note that over time, the tag logic 152 may automatically learn a more suitable duration for the response period. As the tag logic 152 is repetitively transmitting tag signals during the response period after an interrogation signal is received from the reader 26, the tag logic 152 may listen for a new interrogation signal from the same reader 26. Once a new interrogation signal is received, the tag logic 152 is aware that the time window for the previous interrogation signal likely occurred prior to reception of the new interrogation signal. Thus, the duration of the response period for future responses may be shortened such that it is less than the time between the successive interrogation signals. Therefore, when the tag 122 receives an interrogation from the same reader 26 in the future, the tag logic 152 responds by repetitively transmitting tag signals for a shorter duration, thereby conserving power. Specifically, when an interrogation signal is received, the tag 122 should stop transmitting tag signals at least by the time the next interrogation signal is transmitted from the same reader.

As an example, referring to FIG. 8, assume that the tag logic 152 is configured to transmit four tag signals in the response period as shown, although it is possible for the tag logic 152 to be configured to transmit any number of tag signals in the response period in other embodiments. Further assume that at time $t_{int}$, between $t_3$ and $t_4$, the tag 122 receives another interrogation signal. In such embodiment, the tag logic 152 may determine that the response period can be shortened to be between $t_0$ and $t_{int}$ such that, in the future, the tag logic 152 only transmits three tag signals in response to an interrogation signal.

In another embodiment, assume that $t_{int}$ occurs after the last tag signal of the response period (i.e., after $t_4$). In such case, if the delay between the end of the response period (i.e., $t_4$) and the next interrogation signal is greater than a predefined threshold, the tag logic 152 is configured to increase the duration of the response period. The tag logic 152 may also increase or alternatively not change the transmission rate of the tag signals during the response period. Depending on whether and to the extent that the transmission rate is increased, the tag logic 152 may thereafter transmit a higher number of tag signals in the response period and/or spread the tag signals apart more in time.

In addition, the tag 122 may control the rate at which it transmits the tag signals during the response period based on the rate at which the interrogation signals are received regardless of whether the duration of the response period is changed. For example, if the rate of the interrogation signal is relatively high (e.g., the time between successive interrogation signals is long), the tag logic 152 may be configured to control the rate of the tag signals such that the time between successive tag signals is longer. Conversely, if the rate of the interrogation signals is relatively low (e.g., the time between successive interrogation signals is short), the tag logic 152 may be configured to control the rate of the tag signals such that the time between successive tag signals is shorter. In other words, the tag logic 152 may increase the rate of the tag signals when it is determined that the reader 26 is transmitting interrogation signals at a faster rate, and the tag logic 152 may decrease the rate of the tag signals when it is determined that the reader 26 is transmitting interrogation signals at a slower rate.

In another exemplary embodiment, the tag logic 152 is configured to automatically learn the appropriate delay between reception of the interrogation signal and transmission of the tag signal in order to ensure that the tag signal is received during the expected time window without having to repetitively transmit the tag signal. For example, the tag logic 152 may adjust the delay by trial and error until an acceptable delay is found.

In this regard, when an interrogation signal is received by the communication module 175, the tag logic 152 is initially configured to transmit the tag signal after a certain delay. The selection of such delay could be predefined or randomly selected within a predefined range. The tag logic 152 then determines whether the delay is acceptable. Such determination can be performed in a variety of ways. For example, if the reader 26 transmits an acknowledgment of receiving a tag signal within the time window, the tag logic 152 may determine whether the delay is acceptable based on whether an acknowledgement is received.

In another embodiment, the determination about whether the delay is acceptable is made based on whether the controller 36 permits access to the corresponding restricted area 13. For example, in some embodiments, the controller 36 may be configured to inform the server 120 when it is transitioning the locking mechanism 32 to an unlocked state or is otherwise permitting access to the restricted area 13. In such case, the server 120 transmits a message to the tag 122 indicating that the door 42 has been unlocked, and the tag logic 152 determines that the delay used to transmit the tag signal is acceptable. In another embodiment, such as when the server 120 and controller 36 are not configured for communication with each other, the server 120 monitors the location of the tag 122 to determine whether the controller 36 permits access to the restricted area 13 in response to the tag signal from the tag 122.

In this regard, when the tag logic 152 transmits a tag signal to the reader 26, the tag logic 152 may be configured to send a message indicative of such event to the server 120. In response, the server 120 monitors the location of the tag 122 for determining whether the tag 122 moves toward or through the doorway 52 corresponding to the reader 26, such as when the user opens the door 42 and begins to walk through the doorway 52. If so, then it can be assumed that the controller 36 has unlocked the door 42 in response to the tag signal. In such case, the server 120 transmits a message to the tag 122 indicating that the door 42 has been unlocked, and the tag logic 152 determines that the delay used to transmit the tag signal is acceptable. After determining that the delay is acceptable, the tag logic 152 stores a value indicative of such delay and retrieves this value the next time that the tag 122 is to respond to an interrogation signal from the same reader 26 so that the same delay is thereafter used in responding to interrogation signals from this reader 26.

However, if a predefined amount of time elapses after transmission of the tag signal without a determination being made that the aforementioned delay is acceptable, then the tag logic 152 determines that the delay used to transmit the tag signal is unacceptable for the reader 26. In such case, the tag logic 152 uses a different delay for the next interrogation signal from the same reader 26. This process may be repeated until an acceptable delay is found.

As described above, for the reader 26 to perform a successful read of the tag signal, the tag signal should be transmitted at a frequency that is in the reader's frequency window. In one exemplary embodiment, the tag logic 152 assumes that the tag signal should be at the same frequency as the interrogation signal and, therefore, transmits the tag signal at such frequency. Note that there are a variety of ways that the tag logic 152 can determine the frequency of the interrogation signal. For example, the reader data 199 may indicate the transmission frequency of each reader 25-27, and the tag logic 152 may determine the frequency of the reader 26 based on the data 199.

Figure 9:
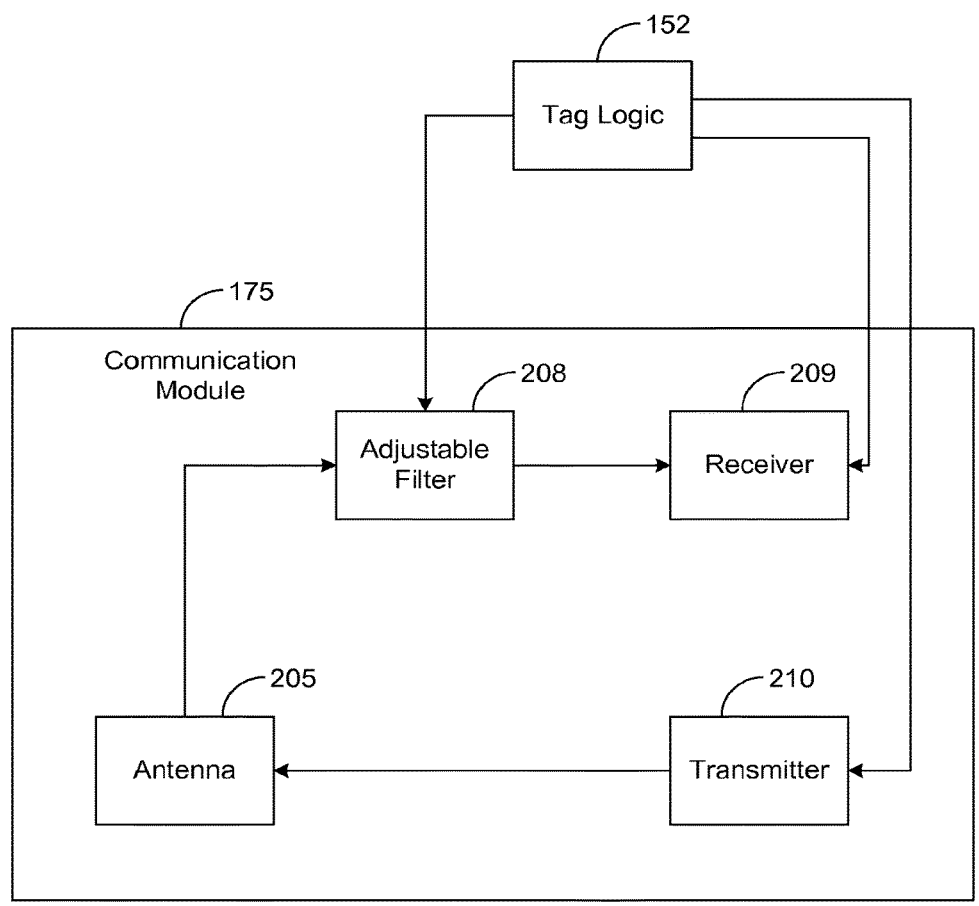
FIG. 9 is a block diagram illustrating an exemplary embodiment of a communication module, such as is depicted by FIG. 5.

In addition, the tag logic 152 may dynamically determine the frequency used by the reader 26. In this regard, FIG. 9 shows an exemplary embodiment of the communication module 175. As shown by FIG. 9, the communication module 175 comprises an antenna 205, an adjustable filter 208, a receiver 209, and a transmitter 210. The adjustable filter 208 is coupled between the receiver 209 and the antenna and has a passband that is adjustable based on a control signal from the tag logic 152. When the transmission frequency of the reader 26 is known (e.g., indicated by the reader data 199), the tag logic 152 is configured to control the adjustable filter 200 such that the frequency of the interrogation signal is within the passband of the filter 208. Thus, when the interrogation signal is received by the antenna 205, the signal passes through the adjustable filter 208 to the receiver 209. The tag logic 152 also controls the transmission frequency of the transmitter 210 such that it is within this same passband. Thus, the communication module 175 transmits and receives at approximately the same frequency, though it is possible for the module 175 to transmit and receive at different frequencies in other embodiments. If the reader 26 transmits and receives at the same frequency, then setting the transmission frequency to the expected frequency of the interrogation signal should ensure that transmitter 210 transmits the tag signal within the appropriate frequency window for successful reception by the reader 26.

In some embodiments, the frequency of the interrogation signal may be unknown to the tag logic 152. In such embodiment, the tag logic 152 may be configured to automatically discover the frequency of the interrogation signal. As an example, the tag logic 152 may be configured to cycle through various frequency bands to find a band for which the interrogation signal is successfully received. In this regard, the tag logic 152 controls the adjustable filter 208 such that it is tuned to a specific frequency band and then waits for a predefined amount of time to determine whether the receiver 209 receives an interrogation signal.

After setting the adjustable filter 208 to a specific passband, the tag logic 152 analyzes the energy passing through the filter to determine whether it defines an interrogation signal. If so, the tag logic 152 sets the transmission frequency of the transmitter 210 within this same frequency band and thereafter communicates with the reader 26 within this frequency. However, if the tag logic 152 does not detect an interrogation signal after the predefined amount of time, the logic 152 adjusts the filter 208 such that its passband is changed and repeats the aforementioned process until the frequency band of the interrogation signal is found.

As described above, for the reader 26 to perform a successful read of the tag signal, the received signal strength of the tag signal should be in the reader's strength window. In one embodiment, the reader data 199 specifies a transmit signal strength for the tag signal, and the tag logic 152 causes the communication module 175 to transmit the tag signal at this indicated signal strength. In another embodiment, the tag logic 152 may find the appropriate signal strength via trial and error similar to the trial-and-error techniques described above for finding the appropriate delay between reception of the interrogation signal and transmission of the tag signal. In this regard, the tag logic 152 may be configured to cause the communication module 175 to transmit the tag signal at a specific power and then determine whether this transmit power is acceptable via the same techniques described above for determining whether the aforementioned delay is acceptable. That is, if the reader 26 successfully receives the tag signal such that the door 42 is unlocked, then the tag logic 152 determines that the transmit power is acceptable. In such case, the tag logic 152 causes the communication module 175 to transmit tag signals to the reader 26 at this same power in the future. However, if the transmit power is determined to be unacceptable, then the tag logic 152 is configured to try a different transmit power the next time the tag signal is transmitted.

In addition, the tag logic 152 may also account for the location of the tag 122 in determining the appropriate transmit power for the tag signal. In this regard, as described above, it is generally expected for the passive tag 22 to be close to the reader 26 when responding to an interrogation signal from the reader 26. However, the active tag 122 may not rely on the energy from the interrogation signal in order to transmit the tag signal and, thus, may be located a greater distance away when responding to the interrogation signal. Generally, when the tag 122 is located a greater distance away from the reader 26, more signal attenuation occurs before the tag signal reaches the reader 26 such that the tag signal arrives at the reader 26 with a lower signal strength. Based on the tag's distance from the reader 26, the tag logic 152 may be configured to adjust the tag signal's transmit power such that it arrives at the reader 26 with a signal strength within the strength window.

In one exemplary embodiment, the reader data 199 may define a table of transmit power values correlated with distance values. In such an embodiment, the tag logic 152 determines the tag's distance from the reader 26. As described above, the server 120 may determine the tag's location and send a message to the tag 122 indicative of the tag's location or its distance from the reader 26. Based on the tag's current distance from the reader 26, the tag logic 152 looks up the transmit power value that is correlated in the table with the tag's approximate distance from the reader 26, and the tag logic 152 then controls the transmitter 210 such that the power of the tag signal is in accordance with that indicated by the correlated power value. Thus, the transmit power of the tag signal is selected based on the tag's distance from the reader 26. The tag logic 152 may also calculate the transmit power on the fly based on the tag's distance from the reader 26.

It is also possible for the transmit power to be selected based on the received signal strength of the interrogation signal. In this regard, the communication module 175 is configured to measure the signal strength of the received interrogation signal and to transmit a value indicative of this measured signal strength to the tag logic 152. Based on this value, the tag logic 152 controls the communication module 175 such that the transmit power of the tag signal is about the same as the received power of the interrogation signal, though it is possible for the tag signal have a higher or lower power.

In one exemplary embodiment, the tag logic 152 uses the location data 121 and the knowledge of the tag's location when the interrogation signal is received in order to determine the distance between the tag 122 and the reader 26. Knowing such distance and the received signal strength of the interrogation signal, the tag logic 152 estimates the transmit power of the interrogation signal (i.e., the power of the interrogation signal at the time of transmission from the reader 26). Based on the distance between the tag 122 and the reader 26, the tag logic 152 then estimates a transmit power for the tag 122 that will likely cause the tag signal to arrive at the reader 26 with a certain signal strength that is based on the estimated transmit power of the interrogation signal. For example, the tag logic 152 may estimate the transmit power that will likely result in the tag signal arriving at the reader 26 with about the same or slightly less signal strength as that of the interrogation signal at the time of transmission from the reader 26. The tag logic 152 then controls the communication module 175 such that the tag signal is transmitted with the estimated transmit power.

As described above, for the controller 36 to grant access to its corresponding restricted area 13, the tag signal should define a valid tag identifier. In one embodiment, the reader data 199 specifies a tag identifier for the tag signal, and the tag logic 152 causes the communication module 175 to modulate the tag signal with the tag identifier. In another embodiment, the tag logic 152 may find a valid tag identifier via trial and error similar to the trial-and-error techniques described above for finding the appropriate delay for transmitting the tag signal in response to an interrogation signal. In this regard, the tag logic 152 may cause the communication module 175 to modulate the tag signal with a specific tag identifier and, after transmitting the modulated tag signal to the reader 26, determine whether this tag identifier is valid via the same techniques described above for determining whether the aforementioned delay was acceptable. That is, if the reader 26 successfully receives the tag signal, and the controller 26 unlocks the door 42 in response, then the tag logic 152 determines that the tag identifier is valid. In such case, the tag logic 152 causes the communication module 175 to continue using this tag identifier to modulate tag signals in the future. However, if the tag identifier is determined not to be valid, then the tag logic 152 is configured to try a different tag identifier the next time the tag signal is transmitted. This process may be repeated until a valid tag identifier is found.

After a door has been unlocked to permit access to a restricted area in response to a tag identifier from the tag 122, it may be desirable to prevent the tag 122 from causing an unlock of the same door for a period of time. In one exemplary embodiment, after a successful unlock event, the tag 122 is prevented from initiating a new unlock event for the same door for a predefined period of time. In this regard, as described above, there are various techniques that can be used to determine when a tag signal has been successfully communicated to a reader 26. Once the tag logic 152 determines that a tag signal has been successfully communicated to the reader 26, the tag logic 152 is configured to refrain from responding to an interrogation signal from the same reader 26 for a predefined time period, thereby preventing multiple unlocks of the same door 42 during the time period.

When exiting a control point, often there is no need for secure egress. However, when employing an embodiment of the disclosure, now even on egress it can be determined whether or not a person having access is granted egress. This may be of particular importance in certain situations where accountability is needed. For instance, in a highrise situation, it may be possible to program a backdoor into the passive systems so that firemen could have a universal access key that broadcast a plurality of keys to gain access to a bank of elevators based on the top 10 manufacturers of controlled access companies in the city. It could then prioritize that key for future passive queries until it no longer works. At which time it would try other keys. Additionally the active device could also hold that key until manually reset after, for example, a fire, whereby it would revert back to a preordered list of keys.

Emergency access and accountable egress also becomes important for rescue personnel when trying to control a highrise. By being able to control the egress point, one can determine who is still inside the controlled area. In another embodiment of the disclosure, passive systems can be used to determine crude locations of active tag wearers by merely monitoring which doors are being unlocked as people pass thru. It would also be useful for systemic clearing of a building so that progress thru the building could be tracked.

In another security-related embodiment, active tags 122 of law enforcement could be quickly configured to emulate a set of passive tags 22 before going into a location. For example, a plurality of tag identifiers of passive tags 22 may be input into an active tag 122 so that this active tag 122 can be used to access all of the restricted areas capable of being accessed via any of the plurality of passive tags 22. In such embodiment, upon receiving an interrogation signal from a reader, the active tag 122 may be configured to cycle through the stored tag identifiers by transmitting each tag identifier to the reader until the reader recognizes at least one of the tag identifiers such that access to the corresponding restricted area is granted. Exemplary techniques for determining when access to a restricted area is granted are described in more detail hereinabove. Since the active tag 122 can be used to access all of the restricted areas accessible via any of the passive tags 22, it would be unnecessary for janitors or other onsite personnel to accompany law enforcement personnel when searching a building.

Furthermore the active tags 122 could be configured so that certain tags 122 only work during certain hours of the day. For instance, in a shopping environment, it is possible to restrict a controller from allowing access to a restricted area outside regular hours, but it is also possible to increase the security of a location so that an active tag 122 only broadcasts tag signals during certain hours. These hours may be coordinated with the shifts that the user of the active tag 122 works.

As an example, FIG. 4 depicts an exemplary embodiment in which the server 120 stores schedule data 206 indicative of a predefined schedule for the tag 122. Such schedule data 206 may indicate time periods in which the tag 122 is to be disabled from responding to interrogation signals. As an example, the time periods may correspond to when the user of the tag 122 is scheduled to be off work or other time period in which it might be desirable for the tag 122 to be disabled. When the server 120 determines that the tag 122 is to be disabled based on such data 206, the server 120 transmits to the tag 122 a message for disabling the tag 122 from responding to interrogation signals. In response, the tag logic 152 is configured to refrain from responding to interrogation signal until it receives another message indicating that it is enabled. In this regard, once the server 120 determines based on the schedule data 206 that the tag 122 should no longer be disabled, the server 120 transmits to the tag 122 a message for enabling the tag 122 to respond to interrogation signals. In response, the tag logic 152 is configured to begin responding to interrogation signals. Selective disabling of the tag 122, as described above, may not only be useful in enhancing the security of restricted areas but also may be useful for conserving the power resources of the tag 122. That is, the tag 122 does not waste power trying to respond to interrogation signals when it should not be in use by its associated user.

As described above, the server 120 may be configured to monitor the location of the tag 122 as it travels. In one exemplary embodiment, the server 120 is configured to control whether the tag 122 responds to one or more interrogation signals based on the tag's tracked movements. For example, assume that the user carrying the tag 122 is authorized to access the restricted area 13 but not the restricted area 12. Such rules may be indicated by the location data 121 stored at the server 120 so that the server 120 is aware of which restricted areas the user is permitted to access.

The server 120 may be configured to enable the tag 122 to respond to interrogation signals only when the tag 122 is within certain areas, referred to herein as "interrogation-enabled zones," such as a predefined distance of a reader that is controlling access to a restricted area for which the user is permitted to access. For illustrative purposes, FIG. 3 shows two exemplary interrogation-enabled zones 213 and 214 for the tag 122. The interrogation-enabled zone 213 corresponds to the reader 26 in that the tag 122 likely receives interrogation signals from the reader 26 when in the zone 213, and the interrogation enabled zone 214 corresponds to the reader 27 in that the tag 122 likely receives interrogation signals from the reader 27 when in the zone 214. In the embodiment shown by FIG. 3, assume that the tag identifier of the tag 122 is valid for readers 26 and 27, which are configured to permit access to the restricted areas 13 and 14, respectively, in response to such tag identifier. The tag 122 may communicate with the reader 26 when in the interrogation-enabled zone 213 and may communicate with the reader 27 when in the interrogation-enabled zone 214, as will be described in more detail below. Further assume that the tag identifier of the tag 122 is not valid for the reader 25. Thus, there is no need for the tag 122 to communicate with the reader 25 for the purpose of attempting to access the restricted area 12 associated with the reader 25. In other embodiments, any number of interrogation-enabled zones corresponding to any number of readers may be implemented, and such zones may be located at any location as may be desired. Note it is unnecessary for the same interrogation-enabled zones to be used for different tags 122.

Initially, when the tag 122 is far from the reader 26 and not within any interrogation-enabled zone 213 or 124 for the tag 122, the tag 122 may be disabled from responding to interrogation signals. Areas outside of interrogation-enabled zones shall be referred to herein as "Interrogation-disabled zones." As the tag 122 approaches the reader 26 and comes within the interrogation-enabled zone 213 associated with this reader 26, the server 120 is configured to detect this event and to then enable the tag 122 to respond to interrogation signals. As an example, the server 120 may transmit a message to the tag 122 instructing it to respond to interrogation signals. Later if the tag 122 leaves such interrogation-enabled zone 213, thereby entering an interrogation-disabled zone, the server 120 may transmit another message for disabling the tag 122 from responding to interrogation signals. Preferably, the tag 122 is enabled to respond to interrogation signals only when it is within one of its interrogation-enabled zones 213 or 214.

In any event, once the tag 122 enters the interrogation-enabled zone 213 for the reader 26, the server 120 enables the tag 122 to respond to interrogation signals, as described above. Thereafter, when the tag 122 receives an interrogation signal from the reader 26, the tag 122 attempts to respond to the interrogation signal by transmitting one or more tag signals to the reader 26. In response to such a tag signal, the controller 36 may unlock the locking mechanism 32, thereby allowing the user to enter the restricted area 13.

Note that the control of the tag 122, as described above, may prevent the tag 122 from attempting to respond to an interrogation signal from the reader 25 as the tag 122 passes by the reader 25. In this regard, as the tag 122 travels, it may come sufficiently close to the reader 25 such that it receives an interrogation signal from this reader 25. If the tag 122 has not yet entered one of its interrogation-enabled zones, such as the interrogation-enabled zone 213 associated with the reader 26, then the tag 122 is disabled from responding to interrogation signals when it receives the interrogation signal from the reader 25. Thus, the tag 122 does not attempt to respond to this interrogation signal.

Preventing the tag 122 from responding to this interrogation signal should not present any operational problems since, in the current example, the user of the tag 122 is not permitted to access the restricted area 12 corresponding to the reader 25. That is, even if the tag 122 responds to the interrogation signal from the reader 25, the controller 35 in the current example should not recognize the tag's identifier as valid and, therefore, should simply discard the tag's response without taking any action to permit access to the area 12. Thus, there is no adverse consequence to preventing the tag 122 from responding to the interrogation signal transmitted by the reader 25.

However, preventing the tag 122 from responding to interrogation signals while outside of the tag's interrogation-enabled zones may have several benefits. For example, the tag 122 is prevented from wasting power attempting to respond to readers, such as reader 25 in the example described above, corresponding to restricted areas that the user is not authorized to access. Also, inadvertent unlocking of doors for various restricted areas may also be prevented. As an example, when traveling to the door 43, the user may walk close enough to the reader 26 to receive an interrogation signal from the reader 26 but not close enough to enter the corresponding interrogation-enabled zone 213. In such case, the tag 122 is not enabled to respond to the interrogation signal, thereby preventing the tag 122 from unlocking the door 42 as it passes. Thus, the user is prevented from unintentionally unlocking the door 42 and potentially compromising the security of the restricted area 13 when he or she passes the reader 26.

The interrogation-enabled zones 213 and 214 may be defined such that the tag 122 is disabled from responding to interrogation signals once it enters into a restricted area. For example, the interrogation-enabled zone 213 associated with the reader 26 may have a boundary at or close to the threshold of door 42 such that the user leaves the interrogation-enabled zone 213, thereby entering an interrogation-disabled zone, when he or she passes through the doorway 52. Therefore, after the user has passed through the doorway 52 and entered the restricted area 13, the tag 122 should be outside of any of its interrogation-enabled zones and, thus, disabled from responding to interrogation signals. This prevents the tag 122 from unlocking the door 42 while it is in restricted area 13. Otherwise, the user could unintentionally cause the door 42 to unlock (potentially compromising the security of the restricted area 13) by walking close enough to the reader 26 such that the tag 122 communicates with the reader 26. To leave the restricted area 13, the user may manually transition the locking mechanism 32 to an unlocked state.

In a further effort to prevent inadvertent door unlocks, the tag logic 152 may be configured to respond to an interrogation signal only if the received signal strength of the interrogation signal exceeds a predefined threshold. Further, the tag logic 152 may be configured to compare the RSSIs of multiple interrogation signals being received by the tag 122 during a given time period and identify the interrogation signal having the highest RSSI, which indicates that this interrogation signal is from the closest reader assuming that all of the readers are transmitting about the same power. If the highest RSSI is above the predefined threshold, then the tag logic 152 is configured to respond to the interrogation signal, referred to hereafter as "strongest interrogation signal," having the highest RSSI while refraining from responding to the interrogation signals having a lower RSSI. Thus, the timing of the tag signal is controlled based on the timing of the strongest interrogation signal, and other communication characteristics of the tag signal may be controlled based on the highest interrogation signal such that the tag signal is successfully received by the reader that originally transmitted the strongest interrogation signal.

Note that it may be desirable for at least some tags 122 to be permitted to unlock the door 42 from the corresponding restricted area 13. As an example, it may be desirable for a tag 122 that is attached to a large piece of equipment to be able to unlock the door 42 from both sides of the door 42, whereas other tags 122, such as tags 122 attached to smaller pieces of equipment, may be allowed to unlock the door 42 only from the side. To enable a tag 122 to unlock the door 42 from the restricted area 13, the location data 121 may be defined such that interrogation-enabled zone 213 is extended into the restricted area 13 as may be desired. Thus, when the tag 122 is within the restricted area 13 and the interrogation-enabled zone 213, the tag is 122 enabled to respond to the interrogation signals from the reader 26 and, thus, transmit tag signals to such reader 26, thereby initiating an unlocking of the door 42 from the restricted area 13.

In addition, if desired, the tag logic 152 may be configured to determine whether it is within an interrogation-enabled zone without communicating with the server 120. As an example, as described above, the tag logic 152 may be configured to track its location based on the received signal strengths of signals from the nodes 101-104 or otherwise. The location data 121 may also be stored in the tag 122 such that the tag logic 152 is aware of the areas that constitute interrogation enabled-zones. In such case, the tag logic 152 can compare its location to the location data 121 to determine whether it is in an interrogation-enabled zone without consulting with or receiving information from the server 120.

In one exemplary embodiment, the tag logic 152 or the server 120 is configured to predict in which restricted area the user of the tag 122 is interested in accessing based on the tag's movements or location. The tag logic 152 may then control the tag 122 such that it responds to interrogation signals from the reader corresponding to the area of interest without responding to interrogation signals from other readers.

As an example, the server 120 may be configured to determine the speed or velocity of the user as he is walking based on changes in the tag's location over time. If the tag 122 approaches a reader without slowing down, the server 120 may assume that the user is not interested in accessing the restricted area corresponding to such reader and, thus, refrain from enabling the tag 122 to respond to the interrogation signals from the reader. However, if the tag's movement begins to slow as it approaches a reader, the server 120 may assume that the user may be interested in accessing the restricted area corresponding to such reader and, thus, enable the tag 122 to respond to interrogation signals from the reader. In such embodiment, the tag's speed may be determined by tracking changes in the tag's location. Also, the tag 122 may be equipped with a motion sensor 189 (FIG. 5), such as an accelerometer, for sensing the tag's motion, and such motion sensor 189 may be used to determine the tag's speed. Further, the tag logic 152 rather than the server 120 may determine whether it is to respond to interrogation signals. As an example, the tag logic 152 may be configured to estimate the tag's speed based on an accelerometer and to refrain from responding to interrogation signals until the tag's estimated speed falls below a predefined threshold.

To better illustrate the foregoing, assume that the user of the tag 122 desires to access the restricted area 14. Also assume that the server 120 is configured to track movement of the tag 122 over time and to enable the tag 122 to respond only when it is in an interrogation-enabled zone for the tag 122. Further assume that the tag 122 enters the interrogation-enabled zone 213 associated with the reader 26 as the user passes within close proximity to the reader 26. At such time, the user's speed is not likely to decrease significantly since his or her destination is the restricted area 14. When the tag 122 enters the interrogation-enabled zone 213, the server 120 would normally enable the tag 122 to respond to an interrogation signals such that the tag 122 would likely respond to interrogation signal from the reader 26. However, before enabling the tag 122, the server 120 is configured to analyze the tag's speed and to determine whether its speed has significantly decreased (e.g., a measured speed has fallen below threshold or a measured deceleration exceeds a threshold) within a predefined distance of the reader 26. If so, the server 120 may assume that user intends to access restricted area 13 and, thus, enable the tag 122 to respond to interrogation messages.

However, in the instant example, the user is actually interested in the restricted area 14 and continues walking at about the same rate of speed as he or she passes the reader 26. In such case, the server 120 determines that the tag's speed has not significantly decreased within the predefined distance of the reader 26 and, thus, refrains from enabling the tag 122 even though it has entered the interrogation-enabled zone 213 associated with the reader 26. Since the tag 122 is not enabled by the server 120, the tag 122 does not respond to interrogation signals from the reader 26 as it passes.

Once the user approaches the reader 27, however, the user may begin to slow since he or she intends to open the door 43 and enter the restricted area 14. When the server 120 determines that the tag 122 has entered the interrogation-enabled zone 214 of the reader 27, the server 120 determines whether to enable the tag 122 based on the tag's speed. In the instant example, the server 120 determines that the tag's speed has significantly decreased within a predefined distance of the reader 27 and, thus, assumes that the user is interested in accessing the restricted area 14 corresponding to such reader 27. Accordingly, the server 120 transmits to the tag 122 a message for enabling the tag 122. Thus, when the tag 122 receives an interrogation signal from the reader 27, the tag 122 responds causing the reader 27 to transition the locking mechanism 33 to an unlocked state, thereby allowing the user to access the restricted area 14.

In other embodiments, other techniques may be used for determining whether to enable the tag 122. As an example, as the user is approaching the reader 26, the speeds or velocities measured for the tag 122 may indicate that the user is turning, such as turning to walk toward the restricted area 14 rather than attempt to access the restricted area 13. Based on such input, the server 120 may determine that the user is not likely interested in accessing the restricted area 13 and, thus, refrain from enabling the tag 122 when the tag is in the interrogation-enabled zone 213 associated with the reader 26 or is otherwise close to the reader 26. Accordingly, the tag 122 is prevented from wasting power by attempting to respond to readers corresponding to restricted areas for which the user is not interested. In addition, inadvertent unlocking of doors to restricted areas that are not of interest to the user can also be prevented.

In one exemplary embodiment, the tag logic 152 is configured to monitor the rate of change of the signal strength of interrogation signals from the same reader in order to determine whether to respond to such signals. This rate of change is indicative of the user's speed as he or she is approaching or passing by the reader. If such rate of change does not indicate that the user is slowing while the interrogation signals are being received, then the tag logic 152 assumes that the user is not interested in accessing the restricted area corresponding to the reader and, therefore, refrains from responding to the interrogation signals. However, if the rate of change indicates that the user is slowing while interrogation signals are being received, then the tag logic 152 assumes that the user is interested in accessing the restricted area corresponding to the reader and, therefore, responds to the interrogation signals by transmitting at least one tag signal to the reader.

To better illustrate the foregoing, assume that the tag 122 begins to receive interrogation signals from the reader 26 as it is approaching such reader 26. As described above, the communication module 175 of the tag 122 measures the received signal strength of the interrogation signals and provides the tag logic 152 a value (RSSI) indicative of the received signal strength. When the RSSI exceeds a predefined threshold indicating that the tag 122 is within a certain distance of the reader 26, the tag logic 152 begins to monitor the rate of change of the RSSI for the purpose of determining whether to respond to the interrogation signals.

If the rate of change of the RSSI over some predefined time period (e.g., one second) is above a predefined threshold, indicating that the speed of the tag 122 is above a threshold, then the tag logic 152 is configured to refrain from responding to the interrogation signals. That is, the tag logic 152 does not transmit tag signals in response to the interrogation signals. However, if the rate of change of the RSSI exceeds the predefined threshold, indicating that the speed of the tag 122 is below a threshold, then the tag logic 152 responds to the interrogation signals by transmitting at least one tag signal, which if successfully received by the reader 26 would initiate an unlocking of the door 42.

In addition, the stability of the rate of change in the RSSI may be used to determine when to respond to the interrogation signals. In this regard, as the user of the tag 122 is walking towards the reader 23, the RSSI of the interrogation signals from the reader 26 is likely to increase to an apex value, which would be measured when the tag 122 is approximately directly in front of the reader 26. If the tag 122 continues to move past the reader 26, then the RSSI should begin to decrease. If the tag 122 transmits a tag signal merely because it receives an interrogation signal from the reader 26, it could result in a security breach by unlocking the door 42 merely because the tag 122 passes by the reader 26 without the user intending to access the restricted area 13.

In one exemplary embodiment, the tag logic 152 refrains from transmitting a tag signal unless and until the RSSI becomes stable, such as when the user of the tag 122 is standing in front of the reader 26 or door 42 waiting for the door 42 to be unlocked. There are various techniques that can be used to determine when the rate of change of the RSSI is stable. In one exemplary embodiment, the tag logic 152 determines that the rate of change of the RSSI is stable when: $(RSSI(t)-RSS(t+n))/RSSI(t)<X$, where $RSSI(t)$ is a measurement of RSSI, $RSSI(t+n)$ is a measurement of RSSI after a predefined time from the measurement of $RSSI(t)$, and X is a predefined threshold. By waiting for the rate of change in RSSI to stabilize before transmitting tag signals to the reader 26, a level of security can be added so that a passing tag 122 does not automatically initiate an unlock of the door 42 when the user of the tag 122 is not likely interested in accessing the corresponding restricted area 13.

In another exemplary embodiment, the tag 122 may be configured to respond to only certain interrogation signals. In this regard, each reader 25-27 may transmit an interrogation signal that is unique relative to interrogation signals transmitted by other readers. As an example, the interrogation signal may define an identifier, referred to hereafter as "reader identifier," that uniquely identifies the transmitting reader relative to the other readers. The reader data 199 may indicate the identifiers of the readers 25-27 for which the tag 122 is enabled to respond. As an example, the tag 122 may be configured to respond only to readers 25-27 corresponding to restricted areas for which the user of the tag 122 is authorized to access. There are various techniques that can be used to control to which readers the tag 122 is responsive.

In one exemplary embodiment, the reader data 199 is used for this purpose. Specifically, the reader data 199 is defined to indicate to which readers 25-27 the tag 122 should respond. As an example, assume that the user of the tag 122 is only authorized to access restricted area 13 such that only reader 26 recognizes the tag's identifier as valid. In such case, the reader data 199 may be defined to indicate that the tag 122 should respond to interrogation signals from the reader 26 but not from readers 25 and 27. As an example, the reader data 199 may be defined to include the reader identifier of reader 26 and not the reader identifiers of readers 25 and 27. When the tag 122 receives an interrogation signal, the tag logic 152 is configured to compare the reader identifier of such signal to the reader identifiers in the reader data 199. If there is a match, then the tag logic 152 determines that it is enabled to respond to the interrogation signal (assuming that that the tag 122 is not otherwise disabled, such as being outside of an interrogation-enabled zone) and, therefore, responds to the interrogation signal by transmitting a tag signal, as described above. However, if there is not a match, then the tag logic 152 determines that it is disabled from responding to the interrogation signal and, therefore, refrains from transmitting a tag signal. Thus, in the instant example in which the data 199 only includes the reader identifier of reader 26, the tag logic 152 should respond to an interrogation signal from this reader 26 and should refrain from responding to interrogation signals from the readers 25 and 27. As a result, the tag 122 does not waste power attempting to respond to interrogation signals from readers corresponding to restricted areas for which the user of the tag 122 is not authorized to access.

In various embodiments described above, the tag 122 is described as transmitting its tag identifier in response to interrogation signals. It should be noted that the same tag identifier may be transmitted each time that the tag 122 responds to an interrogation signal. However, if desired, the tag 122 may be configured to transmit different tag identifiers depending on which reader transmitted the interrogation signal to which the tag 122 is responding.

As an example, two different readers may be associated with two different identification systems such that one reader is designed to operate in conjunction with one conventional passive tag 22 and another reader is designed to operate in conjunction with a different passive tag 22. In such case, the same user may be required to carry two tags (each responding with a different tag identifier) in order to interoperate with both readers. In addition, one reader may have different communication characteristics (e.g., frequency window, time window, and strength window) relative to another reader. The tag 122 may be configured to distinguish interrogation signals from different readers and to change its communication characteristics based on which interrogation signal it is receiving. The tag 122 may also change which tag identifier is transmitted based on the interrogation signal.

To better illustrate the foregoing, assume that the reader 26 has different communication characteristics relative to reader 27. Through techniques described above, the tag logic 152 may learn or otherwise know the communication characteristics of the reader 26 and separately learn or know the communication characteristics of the reader 27. When the tag 122 receives an interrogation signal, the tag logic 152 may determine whether the signal is received from the reader 26 or the reader 27. For example, if the interrogation signal includes a reader identifier, such reader identifier may be used to identify the reader from which the interrogation signal originates. However, in other embodiments, other techniques may be used to determine which reader 26 or 27 transmitted the interrogation signal. For example, if the reader 26 transmits at a different frequency relative to the reader 27, the tag logic 152 may distinguish the interrogation signals based on frequency. Also, the tag's location may be used to distinguish interrogation signals.

In this regard, as described above, the tag logic 152 or server 120 may track the tag's location as it travels. If the tag 122 receives an interrogation signal while it is in a certain location (e.g., close to the reader 26), then the tag logic 152 may assume that it is receiving an interrogation signal from the reader 26. In such case, the tag logic 152 selects the communication characteristics and/or tag identifier appropriate for the reader 26 in order to respond to the interrogation signal. Using the selected communication characteristics, the tag 122 replies with a tag signal that includes the selected identifier. However, if the tag 122 receives an interrogation signal while it is in another location (e.g., close to the reader 27), then the tag logic 152 may assume that it is receiving an interrogation signal from the reader 27. In such case, the tag logic 152 selects the communication characteristics and/or tag identifier appropriate for the reader 27 in order to respond to the interrogation signal. Thus, the communication characteristics (e.g., timing, frequency, and signal strength) and/or the tag identifier of the tag signal may be tailored based on which reader is determined to have transmitted the received interrogation signal. Note that readers may be grouped together for the purpose of selecting communication characteristics and/or tag identifiers. As an example, the readers 25 and 26 may be members of the same identification system. Thus, these readers 25 and 26 may recognize the same tag identifier and use the same communication characteristics. In such case, the tag logic 152 may be configured to select the same communication characteristics and tag identifier when responding to interrogation signals from either reader 25 or 26.

In the embodiments described above, various actions are described as being performed by the tag logic 152 or the server 120. It should be noted that actions described herein as being performed by the server 120 may instead be performed at the tag 122 by the tag logic 152, and actions described herein as being performed by the tag logic 152 may be performed by the server 120.

An exemplary operation and use of the system 100 will now be described in more detail below.

For illustrative purposes, assume that the conventional passive identification system 10 shown by FIG. 1 is used to control access to restricted areas 12-14 at a facility. Also, assume that a user of the passive tag 22 is authorized to access restricted area 13. In such case, the tag identifier of the tag 22 is included in the list of valid identifiers stored at the reader 26.

Further assume that it is desirable to migrate the system 10 from passive to active by using an active tag 122 in lieu of the conventional passive tag 22. In such case, the nodes 101-104 are installed, and location data 121 defining a map of the facility is stored at the server 120. Such location data 121 preferably indicates the locations of the nodes 101-104 and the readers 25-27 on the map. The location data 121 also defines the boundary of the interrogation-enabled zone 213. In addition, the tag identifier of the passive tag 22 is preferably stored in the active tag 122 and used by the tag 122 to request access to restricted areas, as will be described in more detail below.

Initially, the tag 122 is outside of the interrogation-enabled zone 213 corresponding to the reader 26 and, thus, is disabled from responding to interrogation signals. Assume that the user walks toward the door 42 for the purpose of entering the restricted area 13. As the user walks, the tag's location is tracked by the server 120. Once the user moves the tag 122 close enough to the reader 26 such that it enters the interrogation-enabled zone 213 corresponding to the reader 26, the server 120 transmits a message for enabling the tag 122 such that it responds to interrogation signals.

Thereafter, the tag logic 152 responds to an interrogation signal from the reader 26 by transmitting at least one tag signal that indicates the tag identifier previously transmitted by the passive tag 22 that has been now replaced by the active tag 122. As an example, the tag logic 152 may first listen to two consecutive interrogation signals from the reader 26 before transmitting a tag signal. Based on the interrogation signals, the tag logic 152 selects various communication characteristics for the tag signal. As an example, the tag logic 152 may select a transmit power for the tag signal based on the received signal strength of at least one of the interrogation signals. Also, the tag logic 152 may select a rate for transmitting tag signals during a response period and also select a duration of the response period based on the time lapse between the two successive interrogation. Then, upon reception of the next interrogation signal, the tag logic 152 transmits via the communication module 175 tag signals in accordance with the selected communication characteristics.

Assuming that at least one of the tag signals satisfies the time, frequency, and signal strength windows expected by the reader 26, the reader 26 should successfully read such tag signal to determine the tag's identifier and provide this tag identifier to the controller 36, which compares such tag identifier with the list of valid tag identifiers stored at the reader 26. In response to a match, the controller 36 controls the locking mechanism 32 such that it transitions to an unlocked state thereby allowing the user to open the door 42 and enter into the restricted area 13.

Accordingly, the conventional identification system 10 using a passive tag 22 is migrated to a system for which an active tag 122 can replace the passive tag 22 without having to update or change the readers 25-27. Indeed, the migration can be completely transparent to the readers 25-27 while not compromising the security of the restricted areas 12-14.

Note that the tag's communication characteristics include the frequency, power, and timing of the tag signals that are transmitted by the tag 122. Timing of the tag signals involves the decisions about whether and when to transmit tag signals. As described above, the communication characteristics may be selected or otherwise determined based on the tag's location, as determined via communication between the tag 122 and the nodes 101-104. For example, as described above, the tag's location (e.g., whether the tag 122 is within an interrogation-enabled zone) may be used to determine whether the tag 122 should respond to an interrogation signal from a particular reader 25-27. The tag's location may also be used to determine the appropriate signal strength or delay for transmitting a tag signal. Various other types of communication characteristics may be based on the tag's determined location.

For simplicity of illustration, various examples have been described above in the context of a single tag 122. It should be emphasized that the system 100 may be used to simultaneously monitor and track any number of tags 122 according to the techniques described above. In this regard, it is possible for each tag 122 to be associated with a respective set of location data 121 and reader data 199 so that the control parameters (e.g., which restricted areas 12-14 are accessible by the respective tag 122) can be tailored for each individual tag 122.

In one exemplary embodiment, the tags 122 are interchangeable such that the same tag 122 may be associated with different assets at different times. As an example, a tag 122 may be used by an employee during the course of work day and then turned in at the end of his or her shift so that the tag 122 can be used by another employee. Such feature allows multiple employees to share the same tag 122. This feature also allows the tags 122 to be returned to a central location where the tags can be recharged and then distributed to employees without the same tag 122 having to be returned to the same employee.

To allow the same tag 122 to be used by a different employee, it may desirable to update the control parameters of the tag 122 so that they are tailored to the tag's current user. To achieve this, each set of reader data 199 and location data 121 for a particular asset (e.g., employee) is associated with a unique identifier, referred to hereafter as "asset identifier." Thus, the asset identifier may be used as a key to lookup and find the set of reader data 199 and location data 121 that are associated with a particular asset.

When a tag 122 is to be used to track and monitor a particular asset, the asset identifier for this asset is preferably input to the tag 122 or otherwise received by the system 100. As an example, the asset identifier may be input via the input interface 181 of the tag 122. In such case, the tag logic 152 transmits the asset identifier to the server 120, which may be configured to store the sets of location data 121 and reader data 199 for all of the assets to be tracked and monitored by the system 100. In response, the server 120 retrieves the set of location data 121 and the set of reader data 199 associated with the asset identifier and downloads these sets of data 121 and 199 to the tag 122. These sets of location data 121 and reader data 199 are then used to control the tag 122 according to the techniques described above. For example, as described above, the tag 122 may be enabled to respond to interrogation signals from only certain readers based on the location data 121 and/or reader data 199. Note that the tag identifier that is used to access restricted areas 12-14 may be included in the reader data 199 that is downloaded to the tag 122.

At some point the same tag 122 may be coupled to a different asset. For example, an employee wearing the tag 122 may turn in the tag 122 at the end of his or her shift, and the tag 122 may be given to another employee for use in tracking and monitoring this other employee. Each time the tag 122 is transferred to a new asset, the tag 122 is preferably re-commissioned for use with the new asset. In this regard, the aforementioned process of downloading location data 121 and reader data 199 is repeated for the new asset such that the tracking and monitoring of the tag 122 is now based on the location data 121 and reader data 199 associated with the asset identifier of the new asset. Thus, which restricted areas 12-14 are accessible via the tag 122 and the tag's responsiveness to the readers 25-27 may be different for the new asset relative to the previous asset. In this regard, the new reader data 199 downloaded to the tag 122 for use with the new asset includes a new tag identifier that is thereafter transmitted by the tag 122 in response to interrogation signals. Using a different tag identifier can change which of the controllers 35-37 recognize the tag 122 for the purposes of granting access to restricted areas. Also, the new set of location data 121 may define different interrogation-enabled zones for the tag 122 such that the tag 122 is responsive to a different set of readers 25-27 for the purpose of transmitting tag signals. Accordingly, by using a new set of location data 121 and reader data 199 to control the tag 122 for a new user, the operational characteristics of the tag 122 and the system 100 can be tailored for such new user and changed from user-to-user.

To facilitate the entry of asset identifiers during operation, each asset may have or otherwise be associated with a scannable identification card, which can be scanned by the input interface 181 of the tag 122 in order to input the appropriate asset identifier for the asset. As an example, the identification card may have a barcode indicating an asset identifier that can be automatically read by the input interface 181 of the tag 122. By simply scanning the identification card, the tag 122 receives the asset identifier and uses such identifier to automatically adopt the unique control profile associated with the identified asset. Such adoption of new profiles allows tags 122 to be used interchangeably with different users who may be associated with different profiles, as described above. For example, a tag 122 used by one employee may be returned to a central tag repository at the end of the employee's shift, charged overnight, and commissioned for use with another employee the next morning. The ability to use the same tag 122 for multiple assets can reduce the overall number of tags 122 needed for operation and allow central and complete charging of the tags 122 from time-to-time, as well as maintenance performed on any one tag 122 without preventing the tag's user from accessing restricted areas.

Now, therefore, the following is claimed:

1. An active tag for emulating passive tags when communicating with readers of a passive-tag identification system, the readers configured to wirelessly transmit interrogation signals for interrogating passive tags within the passive-tag identification system, the passive tags configured to wirelessly transmit tag signals in response to the interrogation signals, the tag signals including tag identifiers for identifying the passive tags, the readers including at least a first reader and a second reader, the active tag comprising:

a communication module for communicating with the readers, the communication module having a receiver and a transmitter, the receiver configured to receive a first interrogation signal from the first reader and a second interrogation signal from the second reader;

a power supply for powering components of the active tag, including at least the transmitter; and logic configured to control the transmitter such that the transmitter wirelessly transmits a first tag signal in response to the first interrogation signal, the logic configured to determine based on the first interrogation signal at least one of an identifier of the first reader and a frequency of the first interrogation signal, the logic configured to select a first frequency for the first tag signal based on the at least one of the identifier of the first reader and the frequency of the first interrogation signal, the logic further configured to control the transmitter such that the first tag signal is transmitted at the selected first frequency, wherein the first tag signal transmitted at the selected first frequency emulates a transmission from a passive tag for responding to the first interrogation signal, wherein the logic is configured to control the transmitter such that the transmitter wirelessly transmits a second tag signal in response to the second interrogation signal, wherein the logic is configured to determine based on the second interrogation signal at least one of an identifier of the second reader and a frequency of the second interrogation signal, wherein the logic is configured to select a second frequency for the second tag signal based on the at least one of the identifier of the second reader and the frequency of the second interrogation signal, wherein the logic is further configured to control the transmitter such that the second tag signal is transmitted at the selected second frequency, and wherein the second tag signal transmitted at the selected second frequency emulates a transmission from a passive tag for responding to the second interrogation signal.

2. The active tag of claim 1, wherein the logic is configured to communicate with a plurality of nodes of a wireless network of an asset tracking system for determining a location of the active tag.

3. The active tag of claim 2, wherein the logic is configured to determine whether to transmit the first tag signal in response to the first interrogation signal based on the determined location.

4. The active tag of claim 2, wherein the logic is further configured to select the first frequency for the first tag signal based on the determined location.

5. A method for emulating passive tags when communicating with readers of a passive-tag identification system, the readers configured to wirelessly transmit interrogation signals for interrogating passive tags within the passive-tag identification system, the passive tags configured to wirelessly transmit tag signals in response to the interrogation signals, the tag signals including tag identifiers for identifying the passive tags, the readers including at least a first reader and a second reader, the method comprising:

receiving a first interrogation signal from the first reader at an active tag;

receiving a second interrogation signal from the second reader at the active tag;

determining with the active tag based on the first interrogation signal at least one of an identifier of the first reader and a frequency of the first interrogation signal;

determining with the active tag based on the second interrogation signal at least one of an identifier of the second reader and a frequency of the second interrogation signal;

selecting with the active tag a first frequency for a first tag signal based on the at least one of the identifier of the first reader and the frequency of the first interrogation signal;

selecting with the active tag a second frequency for a second tag signal based on the at least one of the identifier of the second reader and the frequency of the second interrogation signal;

transmitting the first tag signal from the active tag to the first reader at the selected first frequency in response to the first interrogation signal, wherein the first tag signal transmitted at the selected first frequency emulates a transmission from a passive tag for responding to the first interrogation signal; and transmitting the second tag signal from the active tag to the second reader at the selected second frequency in response to the second interrogation signal, wherein the second tag signal transmitted at the selected second frequency emulates a transmission form a passive tag for responding to the second interrogation signal.

6. The method of claim 5, further comprising:
wirelessly communicating between the active tag and a plurality of nodes of a wireless network; and
determining a location of the active tag based on the communicating between the active tag and the plurality of nodes.

7. The method of claim 6, further comprising:
storing, in memory, data indicating a plurality of interrogation-enabled zones for the active tag;
determining, based on the data and the determining the location of the active tag, whether the active tag is within one of the interrogation-enabled zones; and
determining whether to transmit the first tag signal from the active tag based on whether the active tag is determined to be within at least one of the interrogation-enabled zones.

8. An active tag for emulating passive tags when communicating with readers of a passive-tag identification system, the readers configured to wirelessly transmit interrogation signals for interrogating passive tags within the passive-tag identification system, the passive tags configured to wirelessly transmit tag signals in response to the interrogation signals, the tag signals including tag identifiers for identifying the passive tags, the active tag comprising:

a communication module having a transmitter and a receiver for communicating with the readers, the receiver configured to receive an interrogation signal from one of the readers;

a power supply for powering components of the active tag; and logic configured to wirelessly transmit a tag signal via the communication module in response to the received interrogation signal, the logic configured to determine a first communication characteristic and a second communication characteristic of the tag signal based on at least one interrogation signal transmitted by the one of the readers such that the tag signal emulates a transmission from a passive tag for responding to the received interrogation signal, the logic further configured to control the tag signal according to the first communication characteristic and the second communication characteristic determined by the logic, wherein the first communication characteristic pertains to a timing of the tag signal, wherein the logic is configured to transmit the tag signal after a predefined delay from reception of the interrogation signal received from the one of the readers such that the one of the readers receives the tag signal within an expected time window for receiving a response to the received interrogation signal, wherein the second communication characteristic pertains to a frequency of the tag signal, and wherein the logic is configured to transmit the tag signal within an expected frequency window for the one of the readers to receive the response to the received interrogation signal.

9. A method for emulating passive tags when communicating with readers of a passive-tag identification system, the readers configured to wirelessly transmit interrogation signals for interrogating passive tags within the passive-tag identification system, the passive tags configured to wirelessly transmit tag signals in response to the interrogation signals, the tag signals including tag identifiers for identifying the passive tags, the method comprising:
- receiving an interrogation signal from one of the readers via an active tag;
- transmitting a tag signal from the active tag to the one of the readers in response to the received interrogation signal;
- automatically determining a first communication characteristic and a second communication characteristic of the tag signal with the active tag based on at least one interrogation signal transmitted by the one of the readers such that the tag signal emulates a transmission from a passive tag for responding to the received interrogation signal; and
- controlling the tag signal with the active tag according to the first communication characteristic and the second communication characteristic determined by the active tag,
- wherein the first communication characteristic pertains to a timing of the tag signal, wherein the transmitting the tag signal comprises transmitting the tag signal after a predefined delay from the receiving such that the one of the readers receives the tag signal within an expected time window for receiving a response to the received interrogation signal, wherein the second communication characteristic pertains to a frequency of the tag signal, and wherein the transmitting the tag signal comprises transmitting the tag signal within an expected frequency window for the one of the readers to receive the response to the received interrogation signal.

10. An asset tracking system, comprising:
- a first reader configured to wirelessly transmit interrogation signals for interrogating passive tags;
- a controller configured to control access to a first restricted area, the controller communicatively coupled to the first reader;
- a second reader configured to wirelessly transmit interrogation signals for interrogating passive tags;
- a network having a plurality of nodes;
- an active tag configured to wirelessly communicate with the nodes for determining a location of the active tag, the active tag configured to receive a first interrogation signal from the first reader and to wirelessly transmit a first tag signal in response to the first interrogation signal, the first tag signal having a tag identifier for identifying the active tag, the active tag configured to determine based on the first interrogation signal at least one of an identifier of the first reader and a frequency of the first interrogation signal, the active tag configured to select a first frequency for the first tag signal based on the at least one of the identifier of the first reader and the frequency of the first interrogation signal, the active tag further configured to control the first tag signal such that the first tag signal is transmitted at the selected first frequency, wherein the first tag signal transmitted at the selected first frequency emulates a transmission from a passive tag for responding to the first interrogation signal,
- wherein the active tag is configured to wirelessly transmit a second tag signal in response to the second interrogation signal, wherein the active tag is configured to determine based on the second interrogation signal at least one of an identifier of the second reader and a frequency of the second interrogation signal, wherein the active tag is configured to select a second frequency for the second tag signal based on the at least one of the identifier of the second reader and the frequency of the second interrogation signal, wherein the active tag is further configured to control the second tag signal such that the second tag signal is transmitted at the selected second frequency, and wherein the second tag signal transmitted at the selected second frequency emulates a transmission from a passive tag for responding to the second interrogation signal, and
- wherein the first reader is configured to receive the first tag signal and to provide the tag identifier to the controller for authorizing access to the first restricted area in response to the first tag signal.

11. The system of claim 10, wherein the active tag is configured to determine whether to transmit the first tag signal in response to the first interrogation signal based on the determined location.

12. The system of claim 10, further comprising a server configured to determine the location of the active tag and to control, based on the location, whether the active tag transmits the first tag signal in response to the first interrogation signal.

13. The system of claim 12, wherein the server is configured to store data in memory, the data indicating a plurality of interrogation-enabled zones for the active tag, wherein the server is configured to determine whether the active tag is in at least one of the interrogation-enabled zones based on the location, and wherein the server is configured to control whether the active tag transmits the first tag signal in response to the first interrogation signal based on the whether the active tag is determined to be within at least one of the interrogation-enabled zones.

* * * * *